(12) United States Patent
Brown et al.

(10) Patent No.: US 7,685,059 B2
(45) Date of Patent: Mar. 23, 2010

(54) METHOD AND SYSTEM FOR A DIGITAL AUTOMATED EXCHANGE

(75) Inventors: Roger G. Brown, 7626 Parkview Cir., Austin, TX (US) 78731; Charles A. Richter, Austin, TX (US); Richard A. Shannon, Austin, TX (US); David Bittle, Austin, TX (US)

(73) Assignee: Roger G. Brown, Austin, TX (US)

( * ) Notice: Subject to any disclaimer, the term of this patent is extended or adjusted under 35 U.S.C. 154(b) by 396 days.

(21) Appl. No.: 11/982,852

(22) Filed: Jan. 26, 2007

(65) Prior Publication Data

US 2008/0228640 A1 Sep. 18, 2008

(51) Int. Cl.
*G06Q 40/00* (2006.01)

(52) U.S. Cl. ...................................... 705/37
(58) Field of Classification Search .................. 705/35, 705/37, 80; 707/100–104; 713/168–170
See application file for complete search history.

(56) References Cited

U.S. PATENT DOCUMENTS

2002/0002523 A1* 1/2002 Kossovsky et al. ............ 705/36

OTHER PUBLICATIONS

Christian Geiger, et al, paper Visual Specification, Modeling, and Illustration of Complex Systems, System Sciences, 1999. HICSS-32. Proceedings of the 32nd Annual Hawaii International Conference on vol. Track6, Jan. 5-8, 1999 pp. 10 pp, retrieved by Examiner from IEEE Explorer, Mar. 26, 2009.*

* cited by examiner

*Primary Examiner*—Mary Cheung
(74) *Attorney, Agent, or Firm*—Pehr B. Jansson; The Jansson Firm

(57) ABSTRACT

A method and system exchanges assets defined as digital automated equities which are objects instantiated with attributes of an asset. Digital automated equities are registered on a common system exchange as offeror mediary objects and matched by comparing their attributes. Capital exchange offer objects define desired matches by identifying a digital automated equity associated with an exchange offer, a exchange price for the exchange and one or more conditions associated with the exchange. A match use case compares attributes of capital exchange offers to determine matches based on the closeness of the capital exchange offers and a negotiate transaction use case supports communication between owners associated with close capital exchange offers to alter attributes in response to a match. Once a transaction is complete, a settle transaction use case exchanges the digital automated equities. Digital automated equities may include a variety of assets, including intellectual property such as patents and trademarks, business plans, stock and confidential information. Further, the present invention provides a secure format for exchange of confidential information in stages.

16 Claims, 15 Drawing Sheets

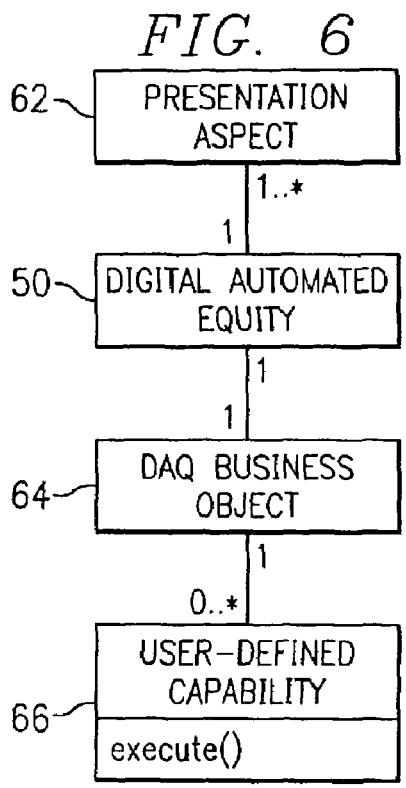
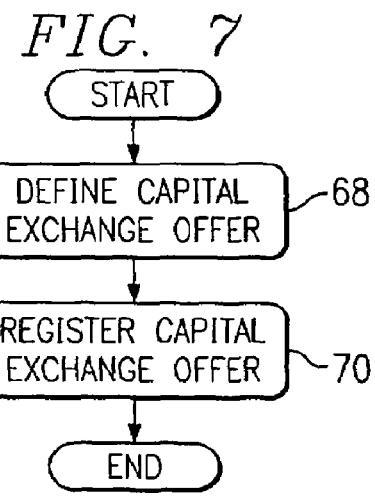
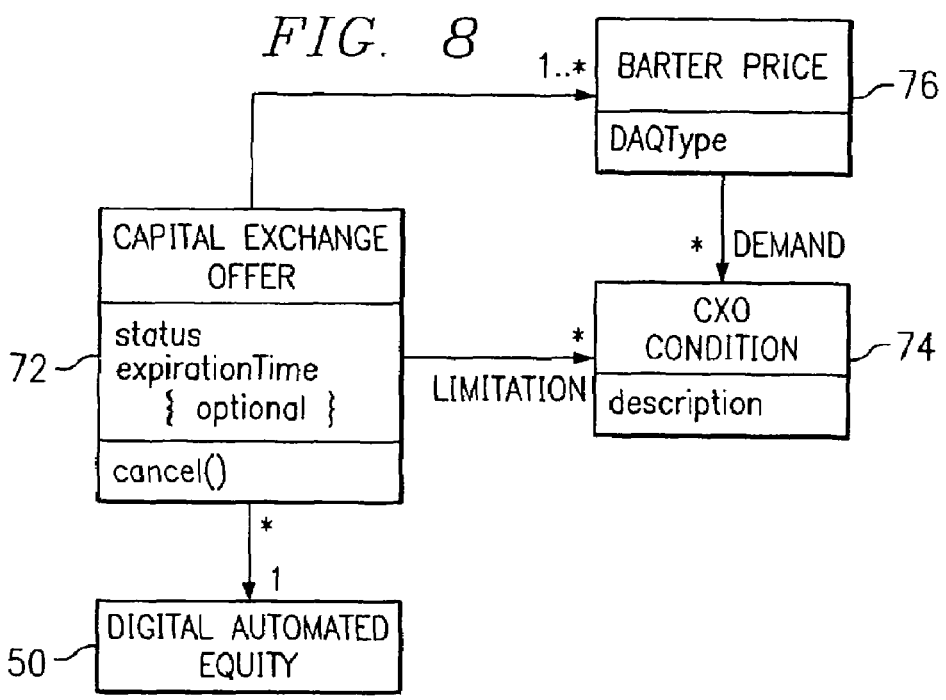

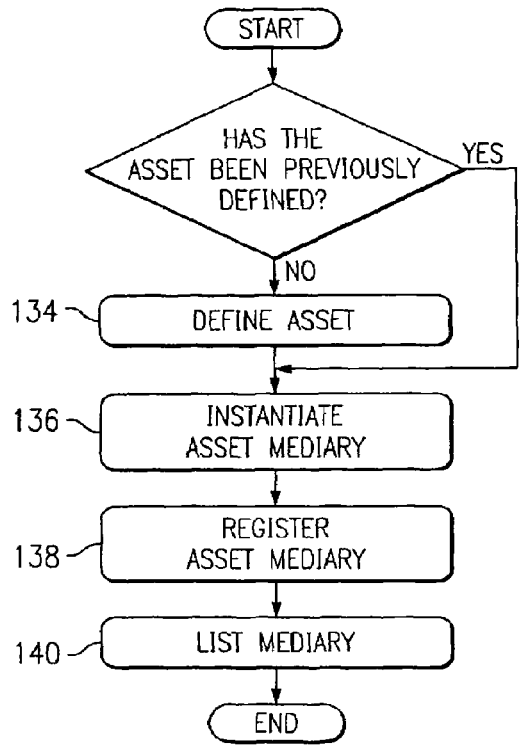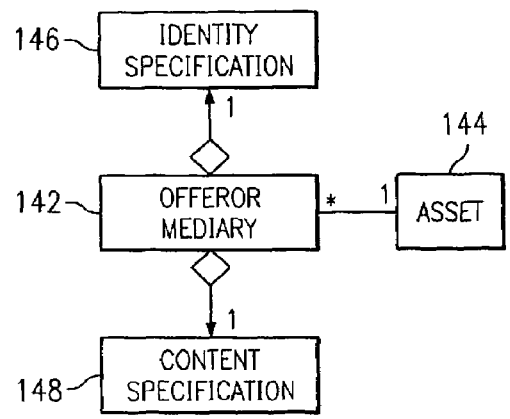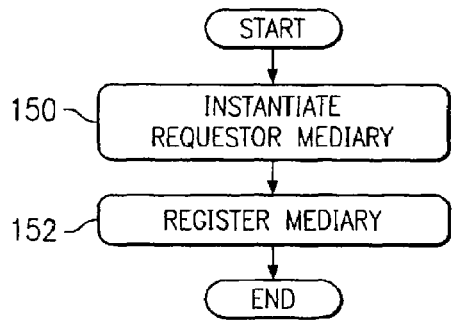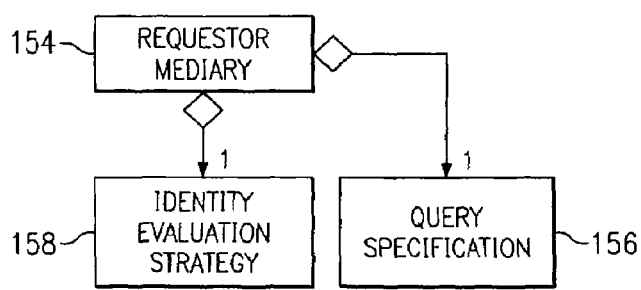

METHOD AND SYSTEM FOR A DIGITAL AUTOMATED EXCHANGE

RELATED APPLICATIONS

This application claims priority from the following provisional applications: "Method and System for Digital Automated Equities Exchange" U.S. Provisional Application Ser. No. 60/194,526, filed Apr. 4, 2000; "Method and System for Digital Automated Equities Exchange" U.S. Provisional Application Ser. No. 60/193,912, filed Mar. 31, 2000; "Digital Automated Trust Process and System for Disclosing Information," U.S. Provisional Application Ser. No. 60/193,536, filed Mar. 31, 2000; "System and Method for Knowledge-Driven Exchange," U.S. Provisional Application Ser. No. 60/193,534, filed Mar. 31, 2000; and "Digital Automated Naming Method and System," U.S. Provisional Application Ser. No. 60/193,541, filed Mar. 31, 2000.

FIELD OF THE INVENTION

This invention generally relates to computer networks, and more specifically relates to a method and system for the automated exchange of equities.

BACKGROUND OF THE INVENTION

An important ingredient in many business transactions is the creation and exchange of various forms of capital. A traditional measure of capital is one's holdings of financial assets such as cash and securities. In many business transactions, however, an equally important form of capital is the ownership of intellectual property. Such intellectual capital consists of assets of intellectual value for which monetary value is sometimes difficult to determine, such as patents, trademarks, and accumulated knowledge.

To support certain business transactions, a business or organization must have a means of exchanging one form of capital for another. This may involve the exchange of one form of traditional financial capital for another, such as offering cash for shares of stock, the exchange of financial capital for intellectual capital, such as buying consulting time or patent rights for cash, or even exchanges that involve only intellectual capital, such as offering consulting time for the rights to a patent.

While existing securities exchanges and other financial markets provide a medium for offering and selling traditional financial capital assets, the marketing and sales of intellectual capital has been a manual, ad hoc process. One impediment to the exchange of intellectual capital is the description and registration of the capital itself. Whereas financial capital such as stocks and bonds have well-defined descriptions and registration mechanisms, intellectual capital typically enjoys no such media and mechanisms.

Another element that affects the exchange of capital is the relative level of knowledge of the bargaining parties. In conducting various forms of business transactions, the value of information or capital being offered by each of the two parties depends in part upon the knowledge each party has of the other. When an entrepreneur seeks venture capital, for example, the identity of a firm offering that capital is one factor in determining the value of the capital. The backing of a respected, big-name firm adds legitimacy to the enterprise. If two venture capital firms offer an equivalent amount of money, therefore, and one firm is more widely recognized and respected than the other, the entrepreneur is likely to assign a different value to those two offers. Likewise, when a venture capital firm evaluates an entrepreneur, the credentials of the entrepreneur are a factor in determining the value of the venture. If all other factors are equal, for example, a stake in the venture of an entrepreneur with a proven track record is more valuable than a position in one in which the entrepreneur has never before started a company.

Current automated exchanges are price-driven. In conventional sales systems, the seller offers a product or service for a specified price, and the buyer must meet that price to close the sale. In the Priceline.com model, the buyer names a price the buyer is willing to pay for a product or service, and any of several sellers can elect to offer the desired product or service for the offered price. In automated auctions, any of multiple buyers can offer a price for a particular item, and the item's seller accepts the highest price (or rejects all offers).

In some instances, the value of an asset offered for exchange is relative to the amount of confidential knowledge that one party is willing to provide to another party. Thus, in conducting business, it is often necessary to disclose confidential information between two parties that are not affiliated with a common business, institution or other type of organizational entity. A disclosing party generally submits confidential information to a receiving party such that the receiving party can make a determination with respect to the confidential information. For example, inventors often disclose patent applications to manufacturers and entrepreneurs for the purpose of selling or licensing the invention and entrepreneurs often disclose business plans to investors for the purpose of obtaining funding for the business venture documented in the business plan. In these types of situations, the disclosure of the confidential information must be conducted in a manner that limits the potential for the confidential information to be misappropriated, made public or otherwise handled in a manner that adversely affects the interests of the disclosing party.

The evaluation of a business plan or patent application typically involves a number of preliminary and intermediate decisions being made during an evaluation period prior to a final decision to, for example, fund a business endeavor or to license or purchase rights to a patent application. These preliminary and intermediate decisions are typically made based on a select portion of the confidential information rather than the confidential information in its entirety. At various phases in the evaluation of a business plan or patent application, only a limited and known portion of the confidential information is used for making the determination to continue with or discontinue the evaluation. Consequently, the disclosure of the confidential information in its entirety at the inception of a business relationship is generally not necessary or desirable. In instances where the confidential information is disclosed in its entirety, the disclosure of the confidential information not used to make the immediate decisions may unnecessarily and unknowingly adversely affect the proprietary position of the disclosing party.

A confidential disclosure agreement (also sometimes referred to as a non-disclosure agreement) is often used as an instrument for facilitating the disclosure of confidential information. The confidential disclosure agreement defines a set of mutually agreed upon terms under which the confidential information is disclosed between two or more parties. The confidential disclosure agreement typically sets forth terms such as the length of time of confidentiality between the parties, the purpose for which the confidential information is being disclosed and the conditions under which one party may disclose and/or use the confidential information without the consent of the other party. In general, the intent of a confidential disclosure agreement is to clarify the expectations of each party associated with the disclosure of the confidential information.

In many business transactions, information is communicated over one or more computer networks. Computer networks such as the Internet present a particularly difficult arena for disclosing confidential information such as business plans and patent applications. The unsecure nature of many computer networks presents valid degree of concern with regards to communicating confidential information. Information, confidential or otherwise, may be intercepted by an unauthorized party while the information is being transmitted from a disclosing party to a receiving party. Even once the information is received by the receiving party, unauthorized personnel may have ready access to the information. Whether the information is intercepted by an unauthorized party during transmission or accessed by an unauthorized party once received by the receiving party, the disclosure of confidential information in its entirety in a single communication can lead to serious and irreparable damage to the disclosing party's interests. This is particularly true with respect to the rights associated with patents and opportunities associated with business plans.

Another example of an asset that is difficult to exchange is a trade or service name. Trade and services mark registers are maintained by the federal government and each of the several states of the United States. Availability of names for use as a trade mark or service mark must are available if not identical to or deceptive similar to a name previously registered. Names for use as the name of a corporation or other legal entity or as an assumed business name are registered with each of the several states and in the case of assumed business names, by counties. In most states, no automated system exists to cross reference reservation and use of a name for a corporation or other legal entity with names registered as an assumed business name or names protected by common law. Names used commercially may be protected by common law without registration if prior commercial use is established.

The legal community and business owners and entrepreneurs and others who service them are faced with a time consuming and laborious task when searching for availability of a name for use within a state and certainly regionally or nationally for any of the purposes mentioned. For example, availability of a name on the Federal Register for Trade Mark or Service Mark does not mean that name is available in each of the several states of the United States; consequently, a search must be made of each of the states in which the business plans to make use of the name. One difficulty is the making of a search of the data base of each of these governmental agencies. Another difficulty is a search of names in other data bases for legal entities and assumed business names as well as data bases for names maintained at the state and county level.

When a search locates similar names used by others, a difficulty often arises in arranging for the use of the name, such as by the offer, sale and/or transfer of the rights to use names. A person or company desiring to acquire the legal rights to a protected name often must perform an investigation to track down the legal owner in order to open negotiations. This process requires the use of all means of communication—telephone, mail, e-mail, fax, and face to face negotiation conferences and is often inefficient and consumes capital and many person hours. The expenditure for tracing may prove fruitless because the owner of the legal rights cannot be found, or when found the owner is not interested in sale and transfer of their legal rights. Similarly, in instances where the law forbids the use of a name that is deceptively similar to another name already in use, a difficulty is presented by the analysis of the factors which are considered to determine similarity and whether the similarity is deceptive.

SUMMARY OF THE INVENTION

Therefore a need has arisen for the facilitation of an integrated exchange of all types of capital, including both financial and intellectual, with a uniform representation of those capital types.

A further need has arisen for a computer-based, automated exchange system in which the uniform representation of capital is the medium of the exchange.

A further need has arisen for a method and system which enhances the determination of value of an offered asset with knowledge beyond the offered price, such as the knowledge of and guarantees by each party obtained during an exchange transaction.

A further need has arisen for a method and system that reduce the risks associated with disclosure of confidential information by disclosure of confidential information in discrete segments.

A further need has arisen for a method and system that provides computerized, simultaneous and automated integration of multiple processes involved in the creation, registration, sale and transfer of names.

In accordance with the present invention, a method and system are provided that provide a uniform exchange for assets of different types. Assets are defined as digital automated equities and registered on a common exchange so that automated matching of the digital automated equities provides a basis for exchanging different types of assets.

In one embodiment, assets are defined as digital automated equities comprising objects instantiated with attributes of the assets. The digital automated equities are registered on an exchange as offeror mediary objects having predetermined attributes for comparison. Assets of one type may define attributes allowing the exchange of the asset for a different type of asset. For instance, a digital automated equity may allow an object representing a patent asset to be exchanged for software programming services to develop the technology of the patent. In this example, the exchange system compares the attributes of the patent digital automated equity with digital automated equities having attributes of programming services.

In another embodiment, the present invention provides a basis for the exchange of confidential information to enhance the valuation of assets proposed for exchange. For instance, a knowledge-driven exchange encapsulates attributes of an offeree in an object and varies conditions of an exchange between an offeror and an offeree based on the attributes of the offeree. A query specification of an offeree establishes the type of information requested by the offeree and relates that information to offered information on the exchange. In a knowledge-based exchange, the level of information available provides a basis for accurate valuation of assets and is exchanged in a manner which limits the risk of inappropriate disclosure.

The present invention provides a number of important technical advantages. One important technical advantage is the facilitation of an integrated exchange of all types of capital, including financial and intellectual capital with a uniform representation. Through representation of assets as objects on a common exchange system, the present invention allows more efficient pricing and exchange of various assets. The use of object oriented techniques allows comparison of predetermined attributes to establish a basis for the exchange of dissimilar assets in a common marketplace. For instance, digital automated equities representing various assets, such as patents, tradenames, consulting time and proprietary information, are listed on a common exchange to allow negotiation and exchange of the assets in an automated manner without translating the value of the assets into monetary values.

Another important technical advantage of the present invention is that the determination of value of offered assets is based on knowledge beyond just the offered price of the asset, to include knowledge and guarantees by each party obtained during an exchange negotiation. Listing of assets as objects allows anonymous exchange of offers with the value of offers unaffected by proprietary information relating to the offeror and/or offeree. By establishing an arms length uniform basis for exchanging different types of assets, the present invention provides an automated trust in which confidential information is exchanged to accurately value assets. Further, by relating disclosure of information to actions performed to obtain that information, the confidentiality of information is better protected. Further segmented disclosure of information allows more precise determination of values as an exchange becomes more likely.

One important technical advantage of the present invention is to achieve savings in time and expense in the process of (1) determining the availability of names for commercial use and (2) selling and transferring rights to names. For example, at present, web site domain names—which are growing at a rapid rate—are regulated by the United States Department of Commerce through an outsourcing contract with Network Solutions, Inc. Domain names are permitted if not identical to a name previously registered. Many domain names have been registered by persons or entities that are making no commercial use of the registered domain name. These domain names are held "on the shelf" by the registrar on speculation that the name will have value to another who wishes to make commercial use of the domain name in connection with an active business. Search for the legal owner of a domain name is not automated at present. The present invention provides an automated method and system for tracking and exchanging domain names.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 6 depicts a class diagram of the general structure of a DAQ;

FIG. 7 depicts an activity diagram that defines the steps in the Issue CXO process;

FIG. 8 depicts a class diagram that defines the results of Define CXO activity;

FIG. 21 depicts an activity diagram for the register asset use case;

FIG. 22 depicts a class diagram for an offeror mediary;

FIG. 23 depicts an activity diagram for the request information use case;

FIG. 24 depicts a class diagram for Requestor Mediaries;

DETAILED DESCRIPTION OF THE INVENTION

Figure 1:
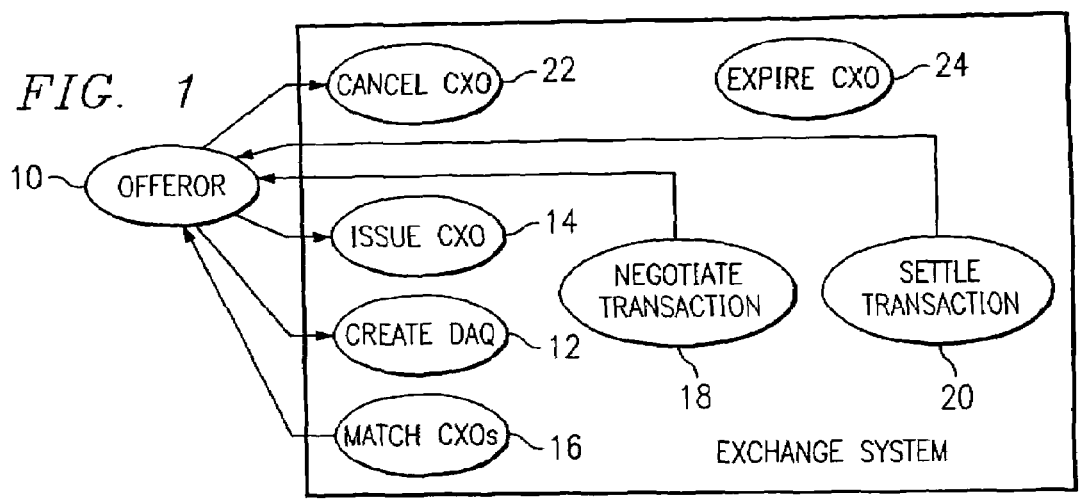
FIG. 1 depicts an UML use case diagram for the overall integrated capital creation process.

Preferred embodiments of the present invention are illustrated in the figures, like numeral being used to refer to like and corresponding parts of the various drawings.

The figures describe a method and a system for the creation of integrated capital and the exchange of that capital in various embodiments. The notation employed for many of the figures in this document is the Unified Modeling Language (UML). The UML is a modeling language aimed primarily at object-oriented systems, applications, and business models. A full description of the UML exists on the Object Management Group (OMG) web page at http://www.omg.org.

The present invention provides a definition for a uniform medium, the digital automated equity (DAQ), for expressing both financial and intellectual capital. An FCDAQ defines a piece of financial capital, such as a stock or bond, whereas an ICDAQ defines a piece of intellectual capital, such as consulting time or a patent. These general types of DAQs may be further specialized. For example, both SecuriDAQs and MoneDAQs are types of FCDAQs. The former represents a stock security, whereas the latter defines a monetary holding. In alternative embodiments, alternative types of DAQs may be defined as desired for different types of capital.

A DAQ is not merely a conceptual entity. It is a three-dimensional graphical object that is tied to an underlying software object. The DAQ presents functions to a user through which that user can query and manipulate the DAQ. The DAQ then interacts with its underlying software object to carry out those requests. Generally DAQs are operational to perform functions including: (1) the ability to calculate a value given certain assumptions (such as securitization by a SecuriDAQ); (2) a maintenance of the its pedigree in terms of a history of transactions in which the DAQ has been involved; (3) an embodiment of variable business logic; (4) an embodiment of variable vocabulary; and (5) an ability to declare its identity. DAQs perform these functions with system-defined content, such as graphical appearance, and system-defined capabilities such as the ability to respond to queries about identity. Additionally, DAQs include user-defined content, such as business plans and presentations, and user-defined capabilities, such as the ability to calculate valuation. Also, DAQs may contain other DAQs that define a portion of value of the overall DAQ, such as a DAQ for warrants for a private company offered for venture capital that includes a DAQ representing the patents owned by the private company.

The present invention also provides for integration of the trading of financial and intellectual capital, where the common expression of that capital is the DAQ. In this integrated exchange, one DAQ is exchanged for another, meaning that DAQs, rather than money, change hands. To offer a DAQ in exchange for some other DAQ, a user creates a capital exchange offer (CXO) that specifies which DAQ is being offered and what is desired in return. In this exchange, therefore, the traditional roles of buyer and seller is altered in the sense that all buyers and sellers are offerors who create CXOs.

In the present invention, therefore, the exchange of DAQs is a two-step process. During the first step, capital is represented as a DAQ. For intellectual property, that property is transformed into intellectual capital that is expressed as an ICDAQ. During the second step, the owner of capital can offer it for exchange by creating and registering the appropriate CXO.

The actual trading of DAQs is facilitated by communicating mediaries. Each party in the exchange is represented by a mediary that can collect information, make offers, and manage exchanges. Like a DAQ, a mediary presents itself as a three-dimensional graphical object that interacts with an underlying soft-ware object. In the case of a mediary, however, that underlying object is a CXO. When the trading exchange matches two CXOs, those CXOs interact with one another and, through their mediaries, handle any subsequent negotiations and the closing of the transaction.

In one embodiment of the present invention a computer-based exchange and supporting communication medium allows the parties in a transaction to exchange information about and guarantees by one another. In a transaction of one or more negotiations, during each of which one party provides information or a guarantee to the other, the disclosure of information is valued, tracked and controlled.

The success of a knowledge-based exchange depends upon the trust of the parties in the exchange and its communication medium. Methods and systems of the present invention include steps that limit the potential for information of a disclosing party to be intercepted and disclosed by an unauthorized party, and they track the disclosure of the various pieces of information. Tracking the disclosure of information greatly reduces the potential for unauthorized access of the information and the use of the information with deceptive intent. For instance, in a disclosure of confidential information, the offeror of that information may elect to disclose it in discrete segments, with the disclosure of each segment requiring a specific piece of information (such as a non-disclosure agreement) or amount of capital from the other party to the transaction. Further, an offeror may provide evaluation criteria to evaluate the identity and guarantees of others when inspecting offers.

In one embodiment of the present invention, a communication medium is established that is trusted by both the receiving and disclosing parties. Methods and systems of the present invention incorporate steps that limit the potential for information of a disclosing party to be unintentionally and unnecessarily disclosed. The methods and systems of the present invention also track the disclosure of the various segments of information. By tracking the disclosure of information, the potential for unauthorized access of the information and the use of the information with deceptive intent is greatly reduced.

Rather than disclose the information in its entirety, the information is disclosed in discrete segments. The disclosure of the information is governed by the fulfillment of certain disclosure enablement acts that permit the next segment of information to be disclosed. By disclosing information in a segmented manner, the disclosure of unnecessary portions of information during an evaluation of an opportunity, technology or other subject matter is greatly reduced.

One enablement act is the execution of a confidential disclosure agreement. In one configuration, the system of the present invention communicates a segment-specific confidential disclosure agreement to the receiving party. To effect the disclosure of the related segment of the information, the receiving party must execute the segment-specific confidential disclosure agreement. Once the executed confidential disclosure agreement is received by the system of the present invention, the related segment of information is communicated to the receiving party.

The information can be disclosed in a mandated (phased) sequence, a non-mandated sequence (parallel) or a combination thereof. In some instances, it is desirable for the information to be disclosed in a predefined sequence. In other instances, it is desirable for the receiving party to be able to at least partially control the sequence in which the information is disclosed. For example, the disclosure of information pertaining to the license of a patent application is well suited to follow a mandated disclosure sequence. The disclosure of information pertaining to the potential investment in an opportunity that is defined in a business plan is well suited to follow a mandated sequence for the initial evaluation and then a non-mandated sequence for the remainder of the evaluation.

To prevent unauthorized access of the information, the method includes several security measures for deterring unauthorized access to the information. One security measure includes an information transmittal authorization request being communicated to the receiving party prior to communication of the information once the receiving party fulfills the required disclosure enablement act. After a system-recognized password is communicated from the receiving party to the system of the present invention, the requested segment of information is communicated to the receiving party. Another security measure includes communicating the information from the system of the present invention to the receiving party in an encrypted format. After the information is communicated, a transmittal confirmation request is communicated from the system of the present invention to the receiving party. A decryption code is communicated to the receiving party once a transmittal confirmation password is communicated from the receiving party to the system of the present invention. A further security measure includes precluding the information or decryption code from being communicated to the receiving party if a predetermined period of time elapses prior to the respective password being received by the system.

The disclosure of the information is logged to provide a record of all related disclosure activities. The communications of the encrypted information segment and the various confirmation requests are logged by the system of the present invention. Similarly, the communications of the related passwords to the system of the present invention are logged. By logging these activities, the potential for unintentional disclosure and unauthorized access of the information is greatly reduced.

In another embodiment of the present invention a computerized method and system are provided that identify names available for use and then aid the exchange of the name, such as for another DAQ. A simultaneous and automated search for name availability in national, state and local data bases, is performed with analysis of similarity factors affecting name availability, name registration in a centralized computer data base that is linked to all federal, state, and local computer name data bases. The identification of a name is coupled with an automated computerized system for offer, sale, and transfer of names.

Exchange System for Digital Automated Equities

Referring now to FIG. 1, a UML use case diagram for the overall integrated capital creation process is depicted in an exchange system 8. An offeror 10, such as an individual or organization, owns capital and may therefore offer that capital in exchange for other capital from another offeror. Offeror 10 employs the Create DAQ use case 12 to create a Digital Automated Equity (DAQ) intellectual capital component (ICC). Offeror 10 can then offer the created ICC for sale by applying the Issue CXO use case 14 to create a Capital Exchange Offer (CXO). Each time a CXO is registered, the system employs the Match CXOs use case 16 to search for a matching offer. When it matches two CXOs, the system initiates the Negotiate Transaction use case 18. During that interval, the two parties negotiate the final terms of the agreement, including a decision to not pursue the agreement. If the two parties reach an agreement, the Settle Transaction use case 20 handles the exchange of assets. Offeror 10 can apply the Cancel CXO use case 22 to cancel an existing CXO. The Expire CXO use case 24 cancels an existing CXO upon a predetermined condition, such as the passage of a predetermined time.

Figure 2:
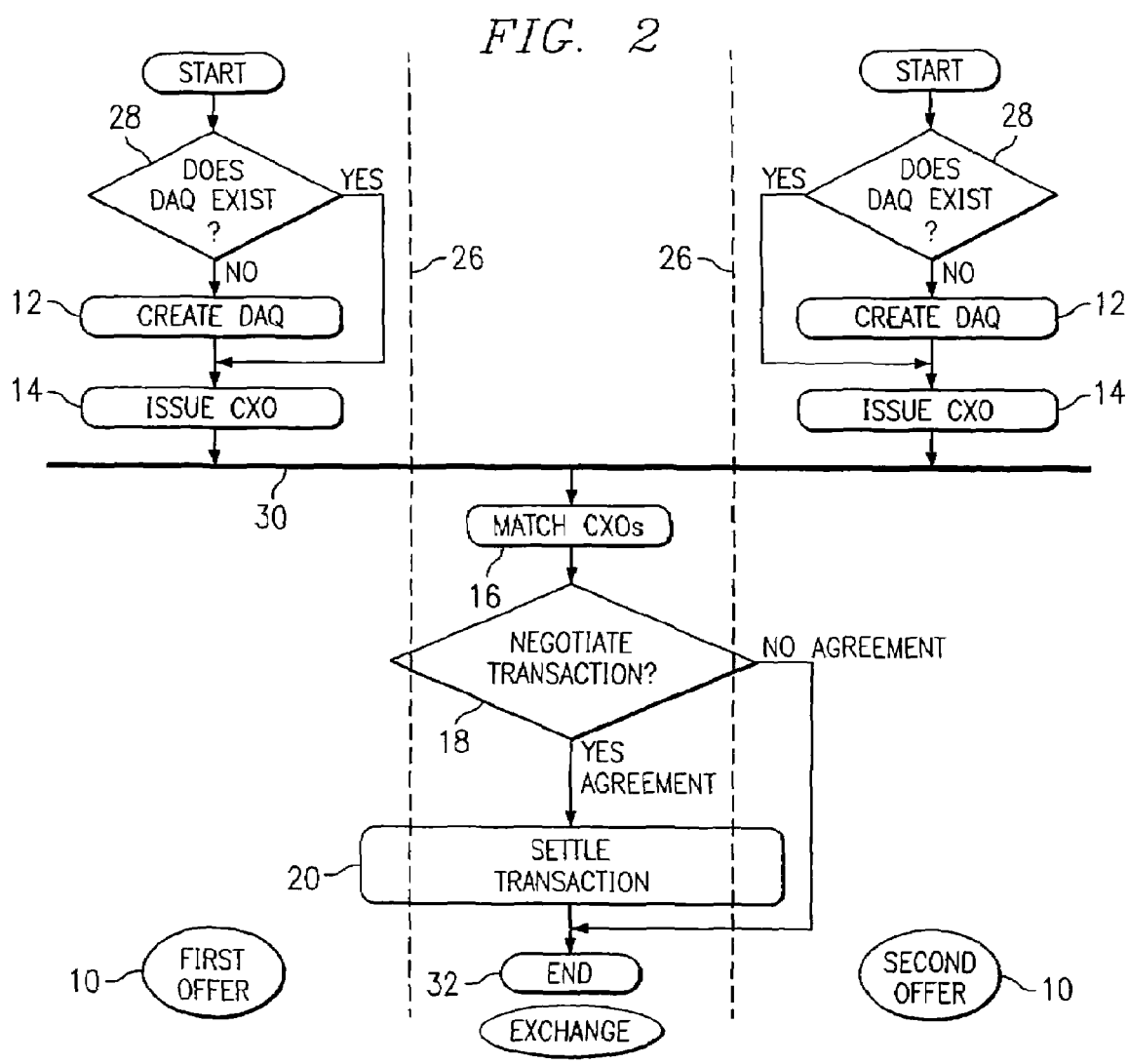
FIG. 2 depicts an activity diagram that describes the temporal flow of the use cases depicted in FIG. 1.

Referring now to FIG. 2, an activity diagram describes the temporal flow of the use cases depicted in FIG. 1. First and second offerors 10 create and exchange DAQs, with the "swim-lanes" 26 in the figure specifying the offeror 10 and use case responsible for executing each activity. At step 28, a determination is made of whether the DAQ exists before a CXO is issued for that DAQ. If no DAQ exists, Create DAQ use case 12 creates a DAQ, and if a DAQ exists, the process proceeds to Issue CXO use case 14. Once a DAQ exists, Offeror 10 can issue any number of CXOs for the DAQ. The presence of two offeror swim-lanes 26 indicates that two distinct offerors 10 have each registered a CXO with Issue CXO use case 14 and are involved in an exchange process. The synchronization bar 30 indicates that the creation of an DAQ and subsequent issuing of a CXO by the two offerors 10 can proceed in parallel, but that both must have registered CXOs before any matching can occur.

Conceptually, the Match CXO's activity, and therefore the corresponding Match CXO use case 16, executes until a match is found, and so when the activity terminates, such a match has been identified. At that point, the two offerors 10 negotiate the transaction with Negotiate Transaction use case 18. If the negotiations are successful, the offerors 10 settle the transaction with Settle Transaction use case 20 and the exchange is complete at step 32. If the negotiations are unsuccessful, then the failure to settle the transaction ends the exchange process at step 32.

Figure 3:
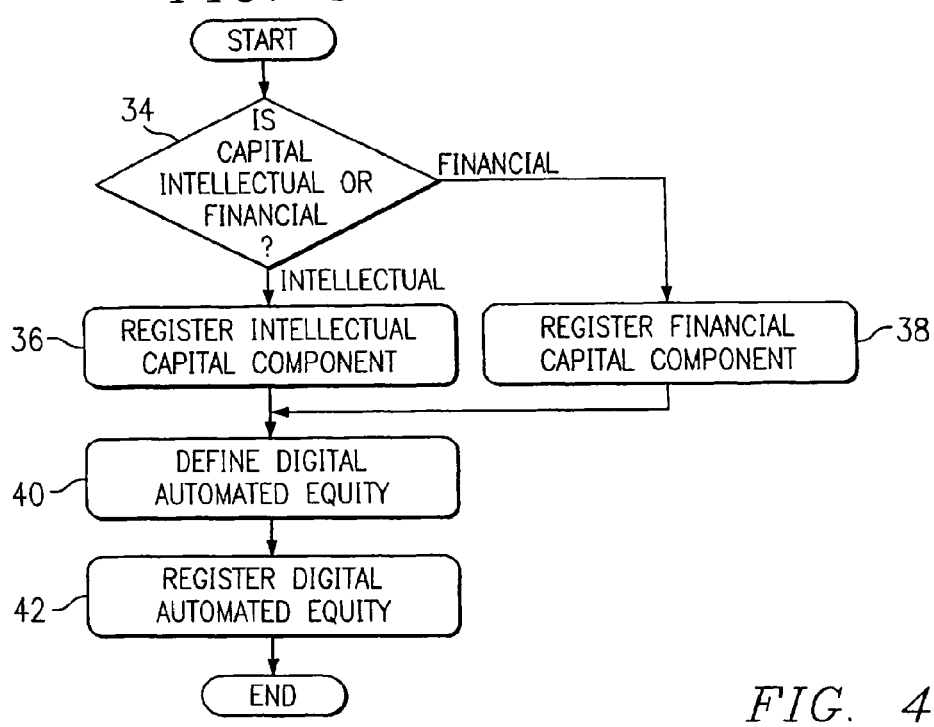
FIG. 3 depicts the steps in the Create DAQ use case.

Referring now to FIG. 3, the steps in the Create DAQ use case 12, and thus the Create DAQ activity of FIG. 2, are depicted for intellectual or financial capital to result in the definition and registration of information for the DAQ. The creation of a DAQ is a three-step process. At step 34, a determination is made of whether the capital is intellectual or financial in nature so that a financial or capital component may be created as appropriate at steps 36 and 38. At step 40, a DAQ is defined, including definition of its appearance and any use-specific content and capabilities. Then at step 42, the DAQ is registered with the exchange system 8.

During registration of the underlying financial or intellectual components of a DAQ, type and property information is collected. At a minimum, a capital component, for example, has a type that defines the general category of the component. For instance, capital components might include types for stock holdings, monetary holdings, etc. . . . , and intellectual capital components might include types for internet domain names, patents, or consulting time. A component's properties, enumerated during the registration at steps 36 or 38, define the exact nature of the component. For an internet domain name, for example, the property of interest is the name itself. For a stock holding, the properties might include the specific security and number of shares held.

Figure 4:
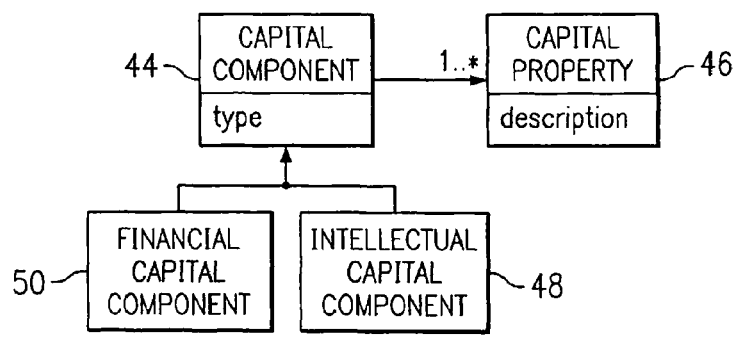
FIG. 4 depicts a class diagram describes the content of an illustrative DAQ resulting from the Create DAQ process.

Referring now to FIG. 4, a class diagram describes the content of an illustrative DAQ that results from the Create DAQ process. Capital component 44 is an abstract class of components having the associated description of capital property 46. Intellectual capital component 48 and financial capital component 50 are specific, concrete types of capital components.

Figure 5:
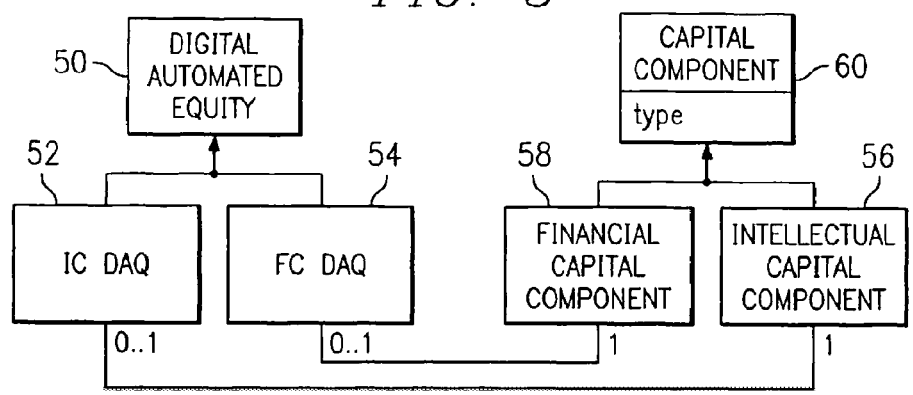
FIG. 5 depicts the relationship between two general types of DAQs.

Referring now to FIG. 5, two general types of DAQs and their relationship to each other are depicted. DAQ 50 includes an intellectual capital DAQ 52 and a financial capital DAQ 54. Intellectual capital DAQ 52 is tied to intellectual capital component 56. Financial capital DAQ 54 is tied to financial capital component 58. Each capital component 56 and 58 from capital component 60 may have a single DAQ issued for it.

Referring now to FIG. 6, a class diagram depicts the general structure of a DAQ 50. Presentation aspect 62 defines the visual appearance of the DAQ, with each presentation aspect 62 defining a single view of the DAQ. An underlying DAQ business object 64 is an application software object that houses the non-presentation, system-defined state and behavior of the DAQ 50. Attached to DAQ business object 64 is a user-defined capability 66 specific to DAQ 50 as specified by offeror 10 at creation of DAQ 50. Capability 66 includes a piece behavior and any state required by that behavior as well as a public interface through which business object 64 may execute the behavior. Offeror 10 assigns the user-defined capability 66 to define and allow access to visual characteristics and rendering of the capability in a presentation aspect 62 for that capability.

In one embodiment, an offeror includes a business plan with a DAQ 50 that represents shares in a private company. User-defined capability 66 is defined by the offeror to include a URL for the business plan and a password to access the business plan. The execution behavior of the capability downloads the document at the URL and opens the document with entry of the password. Presentation aspect 62 defines a graphical user interface or other graphical view of the business plan capability, for instance by allowing a user to point and click to retrieve the business plan. Interaction with the capability causes the DAQ to interact with the DAQ business object 64 for downloading and opening the business plan.

Referring now to FIG. 7, an activity diagram defines the steps in the Issue CXO process in which a CXO is registered for exchange. A Capital Exchange Offer (CXO) is an offer to exchange a capital component, as represented by an existing DAQ, in return for a capital component owned by another offeror. The Issue CXO process includes two steps that are analogous to those for creating an ICC: the define Capital Exchange Offer 68, and the register Capital Exchange Offer 70 with the exchange system 8.

Referring now to FIG. 8, a class diagram depicts the CXO that results from the Define CXO process of FIG. 7. A CXO includes the DAQ for which the CXO is being issued, as well as a set of conditions that define the terms of the offering, i.e., the "exchange price" of the DAQ. A DAQ offered in exchange for another DAQ has the exchange price to define the type of capital component or DAQ desired in return, the amount of the component desired and any other conditions that apply. For instance, an offering of an ICDAQ such as an internet domain name in exchange for conditions such as a requested price, defined in terms of a MoneDAQ (a monetary DAQ), would involve an exchange price specifying an amount of MoneDAQ. As another example, an offering of a patent might seek conditions such as a price in a MoneDAQ or a price in shares of stock such as a SecuriDAQ, and include an indication of whether the offering is for a full transfer or a mere licensing of the patent rights.

CXO 72 of DAQ 50 includes a set of CXO conditions 74 that limit the offering, with each condition describing a limitation. For instance, a DAQ representing a patent might be offered with the condition that the offer is for predetermined licensing rights rather than assignment of all rights. Exchange price 76 defines the DAQ asked for the exchange. CXO 72 includes an expiration time with an "optional" property indicating that the offer is valid until fulfilled or canceled.

Figure 9:
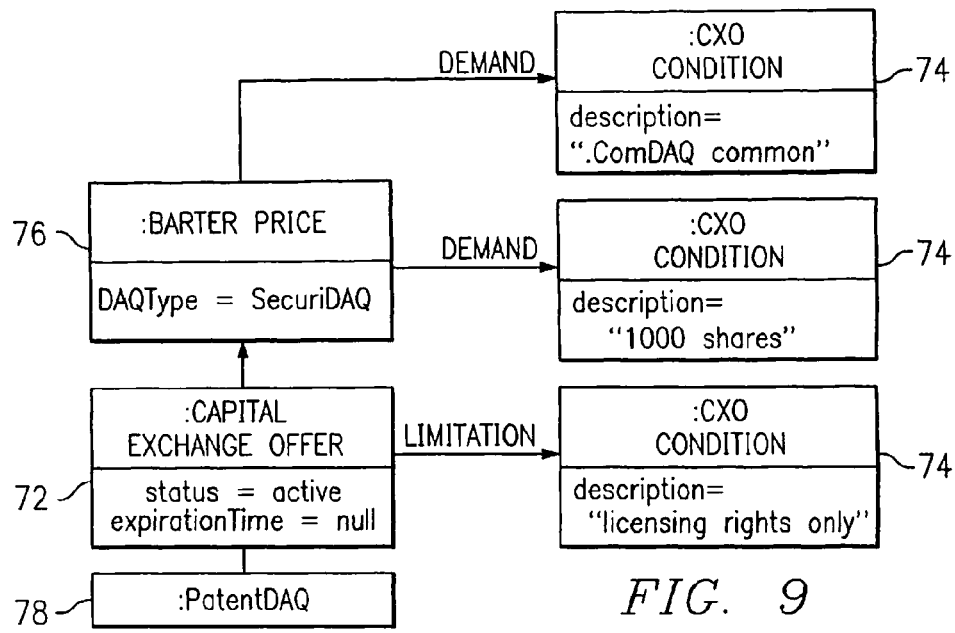
FIG. 9 depicts an instance diagram for a CXO.

Referring now to FIG. 9, an instance diagram depicts a CXO 72 that offers a Patent DAQ 78 with a CXO condition 74 or licensing rights only in exchange for a exchange price 76 with CXO conditions 74 of 1000 shares of common stock. The instance diagram illustrates the relationship of CXO conditions to the offered DAQ and the proposed exchange price.

Figure 10:
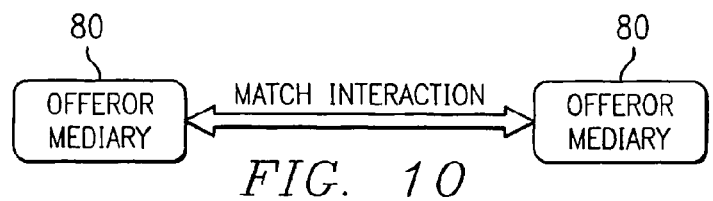
FIG. 10 depicts the interaction of first and second mediaries to match offers.

Referring now to FIG. 10, the interaction of first and second mediaries to match offers is depicted. The exchange system continually carries out the Match CXOs use case 16 as depicted in FIG. 2 to match a pair of CXOs. Upon registration of a CXO, a corresponding CXO mediary 80 is created and initiated to act as an agent for the CXO. CXO mediary 80 embodies a thread of execution that searches exchange system 8 for other CXO mediaries and determine whether a match exists with the exchange price of the found mediary CXO.

Generally, the Match CXOs process operates on a candidate CXO and attempts to find an existing CXO that matches the candidate CXO. The first step in the matching process is to select CXOs based on DAQ type. This process eliminates CXOs that, because they are not offerings of the desired type of DAQ, cannot possibly match the candidate CXO. What remains after than step is a list of CXOs that potentially match the candidate CXO. The remaining steps iterate through that list, selecting each existing CXO and comparing it to the candidate CXO. The properties of each of the two CXOs' DAQs are compared to the other CXO's conditions; if the two sets of properties do not match, the CXO is discarded. For example, if one CXO offers a domain name in return for cash, but the other CXO offers consulting time in return for a domain name, the two CXOs cannot match. Otherwise, the conditions of the CXOs are compared to obtain a measure of how "close" the two sets of conditions match one another. If the two sets of conditions do not match at all, the CXO is discarded. Otherwise, the selected CXO is placed in the list of matching CXOs ordered by the "closeness" measurement so that the CXO that is "closest" to the candidate CXO appears first. At the end of this process, the ordered list of matching CXOs is sent to the Offeror who issued the candidate CXO.

Figure 11:
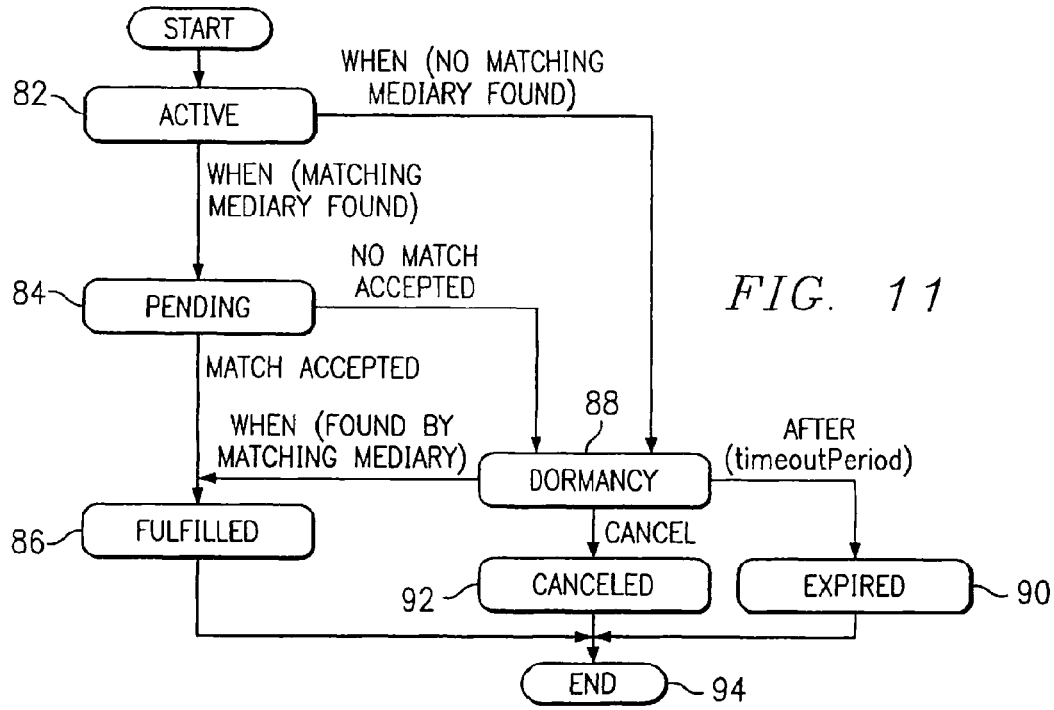
FIG. 11 depicts the life cycle of an offeror mediary.

Referring now to FIG. 11, a state transition diagram depicts the life cycle of a CXO mediary. The matching operation between two Mediaries is commutative, meaning that if a first Mediary inspects a second Mediary and determines that a match exists, then should the second Mediary inspect the first, it would identify the same match. If a Mediary fails to find a matching Mediary it enters a dormant state, and remains in that dormant state until a subsequently issued Mediary inspects it and finds a match, or until it is canceled or expires.

The initial state of the life cycle of an Offeror Mediary is active state 82 in which the Mediary inspects other Mediaries of exchange system 8 to determine a Match. If a Match is found, the Offeror Mediary transitions to a pending state 84 until the Match is either accepted or not accepted. If the Match is accepted, the Offeror Mediary transitions to fulfilled state 86 indicating that the Mediary is no longer available for completion of the state transitions at state 94. If no matching Mediary is found at active state 82, or no Match is accepted at pending state 84, then the Offeror Mediary transitions to dormancy state 88 in which it is available for inspection by other Mediaries. If another Mediary in active state 82 inspects and Matches a Mediary in dormancy state 88, then the Mediary in dormancy state 88 may transition to fulfilled state 86 if the matching Mediary results in an accepted Match.

As FIG. 11 indicates, a dormant Mediary can expire at expired state 82. A CXO Mediary shares its CXO's expiration time set through expire CXO use case 24. When that expiration time arrives, the status of both the Mediary and the CXO is altered to indicate that the offer has expired. In addition, a dormant Mediary can be canceled by applying the Cancel CXO use case 22 at canceled state 84. When an Offeror elects to cancel an existing, unfulfilled offer, the Offeror invokes the CXO's cancel method, such as through a cancel graphical user interface. The CXO then cancels its Mediary, which results in the immediate withdrawal of the Mediary.

Figure 12:
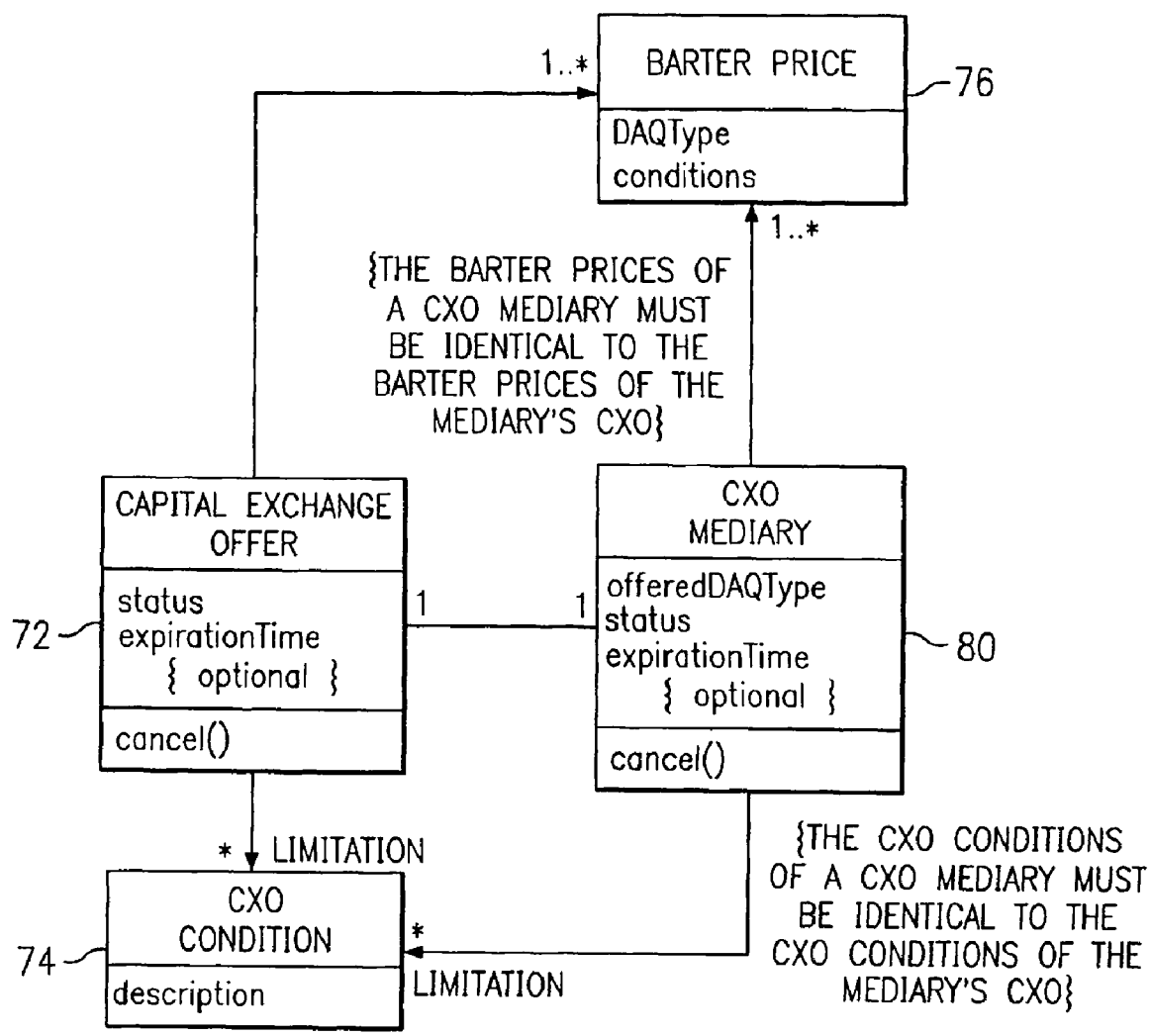
FIG. 12 depicts a class diagram for a CXO mediary.

Referring now to FIG. 12 a class diagram for the CXO Mediary 80 is depicted. Each CXO Mediary 80 has a status that reflects its state as specified by FIG. 11, and shares the expiration time of its CXO and the DAQ type of its CXO's DAQ. In addition, the CXO Mediary 80 has the same exchange price 76 and conditions 74 as its CXO, as indicated by the two constraints in FIG. 12. When a CXO Mediary 80 is first registered, it searches the existing dormant CXO Mediaries for matching CXOs. This is the Match CXO use case 16 and activity in FIGS. 1 and 2, respectively.

Figure 13:
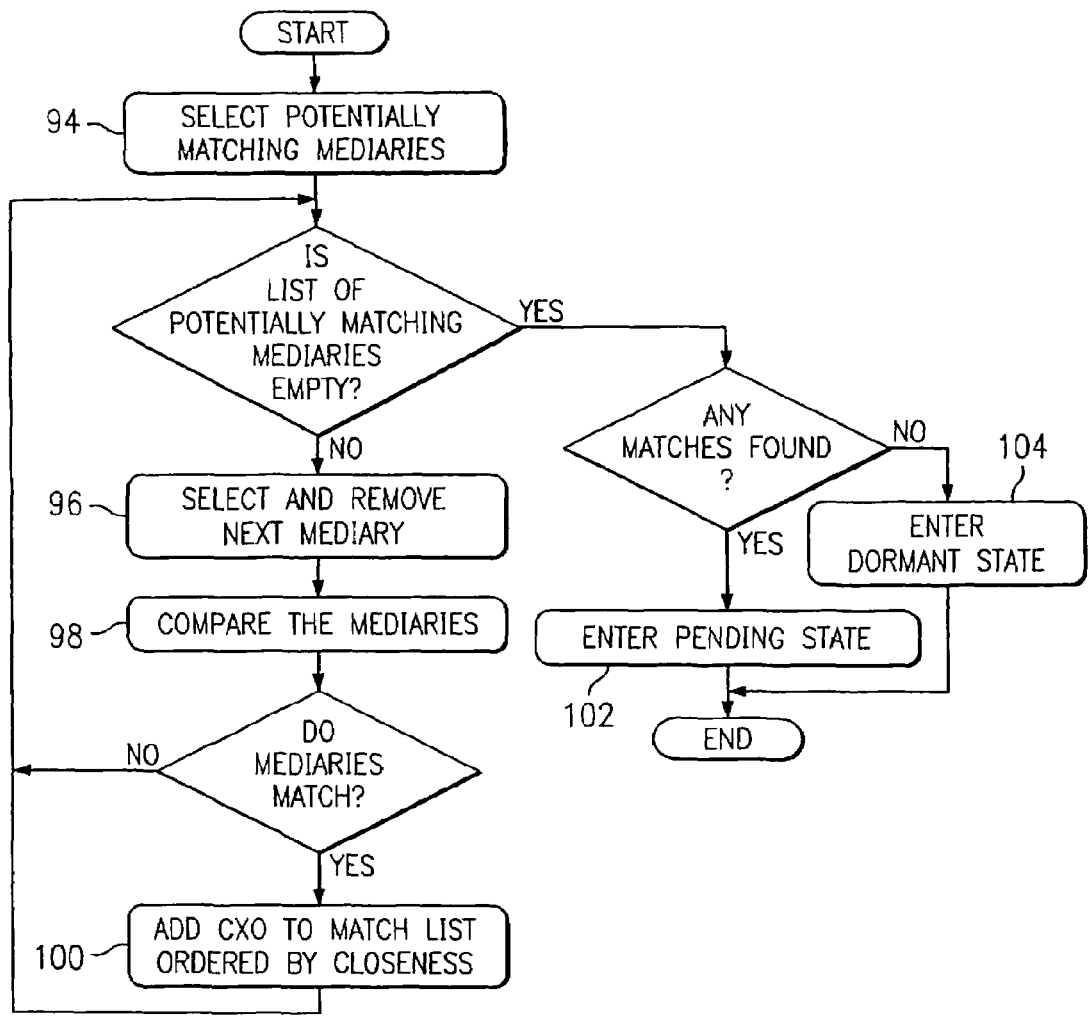
FIG. 13 depicts an activity diagram for the Match CXO use case.

Referring now to FIG. 13, an activity diagram defines the basic steps that occur during that Match CXOs process. During the Match CXOs process, the candidate Mediary identify any existing Mediaries that match it. As its first step, the Mediary selects dormant Mediaries that satisfy the following two rules:

1.) The DAQ type being requested by the candidate Mediary, as specified in the Mediary's exchange price, matches the type of DAQ being offered by the other Mediary; and
2.) The DAQ type being offered by the candidate Mediary, as specified by the Mediary's offered DAQ type, matches the DAQ type of the exchange price of the other Mediary.

For example, if a Mediary represents an offer to exchange stock shares for money, then only offers of MoneDAQs in exchange for SecuriDAQs match this Mediary. Thus, the selection activity 94 eliminates Mediaries from consideration that, because they are not offerings of or requests for the correct types of DAQs, cannot match the candidate Mediary, select and remove step 96 selects a potential Match from the list of potential Matches generated by select step 94 and forwards the potential Match to compare step 98 for a comparison between the active CXO Mediary and the Selected Potential Match Mediary. If there are Matches between the active CXO Mediary and the list of potential Matches, at step 100 the CXOs corresponding to the matching Mediaries are ordered by closeness. If Matches are found, the Mediary enters the pending state at step 102. If no Matches are found, the Mediary enters the dormant state at step 104.

Figure 14:
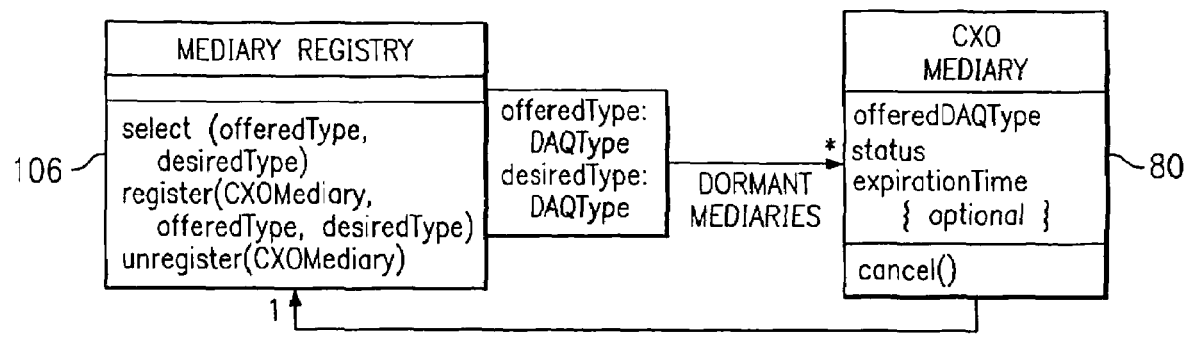
FIG. 14 depicts a class diagram for a mediary registry.

Referring now to FIG. 14, a class diagram depicts how the selection is accomplished. A Mediary Registry 106 maintains a list of dormant CXO Mediaries. Furthermore, that list is qualified (that is, keyed) by the combination of the offered and desired DAQ types of the Mediary. When asked by a CXO Mediary 80 to select CXO Mediaries for a specific offered type and a specific desired type, the Mediary Registry 106 returns a list of Mediaries with those combinations of types. For instance, in the example cited earlier in which the licensing rights of a patent are offered in exchange for 1000 shares of common stock, the CXO Mediary 80 would ask the Registry for a list of existing, dormant CXOs whose offered type is a SecuriDAQ and whose desired type is a PatentDAQ. When a CXO Mediary 80 finds no matching Mediaries and therefore becomes dormant, it registers with the Mediary Registry so that future CXO Mediaries will find and attempt to match it. Likewise, a matched, canceled, or expired Mediary unregisters itself with the Registry upon cancellation or expiration.

What remains after the selection is a list of Mediaries whose CXOs potentially match the CXO of the candidate Mediary. The candidate Mediary iterates through that list, comparing its CXO conditions to the conditions of the other Mediary's exchange price, and requesting the other Mediary to compare its CXO conditions to the conditions in the candidate Mediary's exchange price. If both match, the other Mediary's CXO is added to a list of matching CXOs and the list is ordered by a "closeness" measurement so that the CXO that is "closest" to the candidate CXO appears first. At the end of this process, the ordered list of matching CXOs is sent to the Offeror who issued the candidate CXO.

Figure 15:
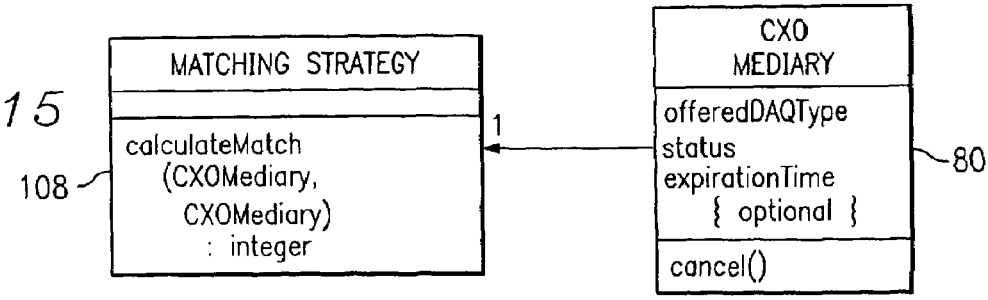
FIG. 15 depicts the mechanism for handling the matching process.

Referring now to FIG. 15, the basic mechanism that handles the matching is depicted. A CXO Mediary 80 employs an instance of a Matching Strategy class 108 that performs the matching. Matching Strategy instance 108 includes a calculateMatch method that, given two CXO Mediary instances, inspects the two instances and determines how closely the two match one another. That method returns an integer value indicating the relative closeness of the match. The higher the value, the more closely the two Mediaries match.

Matching Strategy class 108 is an abstract class, and its calculateMatch method is an abstract method. Each concrete subclass of Matching Strategy class 108 implements a particular matching algorithm. This is an application of the "Strategy" design pattern. Treating the matching algorithm as a separate class hierarchy allows the introduction of improved matching algorithms over time.

Once an active CXO Mediary 80 and its corresponding CXO have matched one or more dormant CXO Mediaries, the exchange system 8 presents the Offeror 10 of the active CXO Mediary 80 with the CXOs of those matching Mediaries, ordered by the closeness of the match. The Offeror inspects each and initiates negotiations for any matching CXO in which the Offeror is interested in pursuing further. The actual negotiation, depicted as the Negotiate Transaction use case 18 may employ the Staged Disclosure of Information Over a Computer Network process. The Offerors of both matching CXOs participate in that staged disclosure process. During that process, each Offeror may elect to release to the other Offeror additional information about the DAQ being offered. An Offeror of a PatentDAQ, for example, may choose, upon receipt of an electronic non-disclosure agreement, to provide additional details of the patent. An Offeror can also employ the system-defined and user-defined capabilities of a matching CXO's DAQ when evaluating the Offeror's interest in that CXO.

Figure 16:
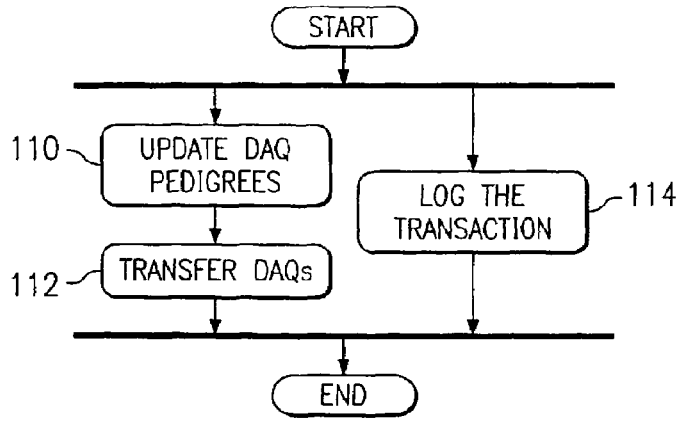
FIG. 16 depicts an activity diagram for the Settle Transaction use case.

Upon completion of the Negotiate Transaction use case 18, the two Offerors have either agreed to the exchange of DAQs or one of the Offerors has terminated the negotiation process. If the Offerors have agreed to an exchange, then the Settle Transaction use case 20 is applied to finalize the transaction. Referring now to FIG. 16, an activity diagram defines the steps in that use case. At Step 110, each DAQ's "pedigree" is updated to include the new owner of the DAQ, and at Step 112, each of the DAQs is physically transferred from one Offeror to the other. Concurrent to those activities, the entire transaction is logged at Step 114.

Figure 17:
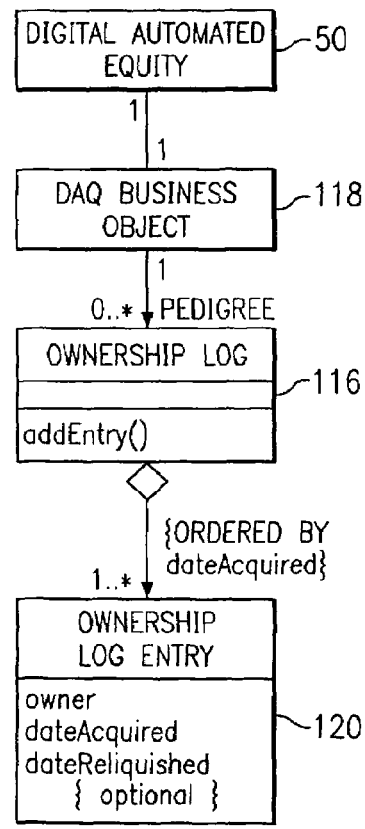
FIG. 17 depicts a class diagram for the ownership log of a DAQ.

The pedigree of a DAQ is, at least in part, its list of owners. Referring now to FIG. 17, a class diagram defines the Ownership Log 116 of a DAQ. The Ownership Log 116 is linked to the DAQ Business Object 118, which is the underlying application software for the DAQ. The Log contains a list of Ownership Log Entries 120. Each Entry retains the owner and the dates that owner acquired and relinquished the DAQ. The relinquish date is optional, as the current owner of the DAQ has no such date. An Ownership Log's Entries are ordered by their acquisition dates.

Figure 18:
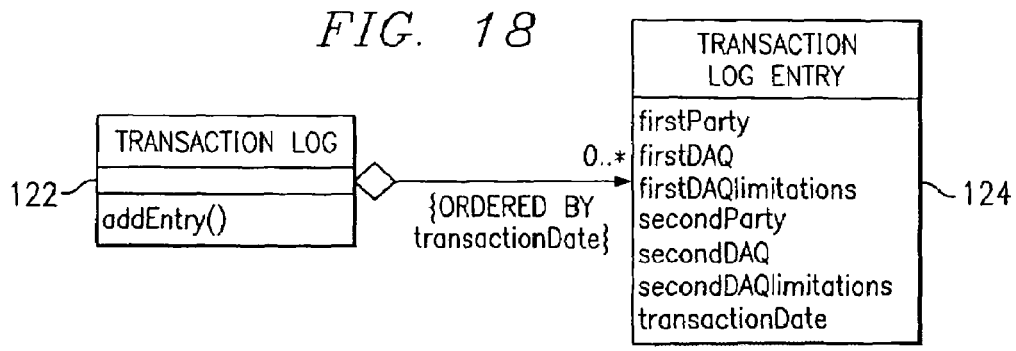
FIG. 18 depicts a class diagram for the transaction log.

Referring now to FIG. 18, a class diagram defines the overall transaction log 122 maintained by the exchange system 8. Each time one DAQ is exchanged for another, the system logs the identities of the two parties, two DAQs that were exchanged, and any limitations to the exchange with transaction log entry 124.

Staged Disclosure in Knowledge-Driven Exchange

Another embodiment of the present invention is the staged disclosure of non-public information to another party. The information is disclosed in one or more discrete segments governed by the fulfillment of certain disclosure enablement acts that permit the next segment of information to be disclosed. By disclosing information in a segmented manner, the disclosure of unnecessary portions of information during an evaluation of an opportunity, technology or other subject matter is greatly reduced.

For instance, in one embodiment of staged disclosure, a confidential disclosure agreement is executed in conjunction with communication of segments of information. To effect the disclosure of the related segment of the information, the receiving party must execute a segment-specific confidential disclosure agreement. Once the executed confidential disclosure agreement is received by the exchange system, the related segment of information is communicated to the receiving party.

The information can be disclosed in a mandated (phased) sequence, a non-mandated sequence (parallel) or a combination thereof. In some instances, it is desirable for the information to be disclosed in a predefined sequence. In other instances, it is desirable for the receiving party to be able to at least partially control the sequence in which the information is disclosed. For example, the disclosure of information pertaining to the license of a patent application is well suited to follow a mandated disclosure sequence. The disclosure of information pertaining to the potential investment in an opportunity that is defined in a business plan is well suited to follow a mandated sequence for the initial evaluation and then a non-mandated sequence for the remainder of the evaluation.

This process is knowledge-driven in that the owner of the information uses knowledge about the requester, as well as guarantees provided by the requester, in evaluating whether to release the information. If the requester resides in a country that does not recognize intellectual property rights, for example, or if the requester is a competitor, the information's owner may elect not to pursue the disclosure process. Likewise, the information's owner evaluates the guarantees offered by the requester, such as a promise to use all due diligence to maintain the privacy of the information, at each step of the disclosure process.

To prevent unauthorized access of the information, the method includes several security measures for deterring unauthorized access to the information. One security measure includes an information transmittal authorization request being communicated to the receiving party prior to communication of the information once the receiving party fulfills a required disclosure enablement act. After a system-recognized password is communicated from the receiving party to the exchange system, the requested segment of information is communicated to the receiving party. Another security measure includes communicating the information from the exchange system to the receiving party in an encrypted format. After the information is communicated, a transmittal confirmation request is communicated from the exchange system to the receiving party. A decryption code is communicated to the receiving party once a transmittal confirmation password is communicated from the receiving party to the exchange system. A further security measure includes precluding the information or decryption code from being communicated to the receiving party if a predetermined period of time elapses prior to the respective password being received by the system.

The disclosure of the information is logged to provide a record of all related disclosure activities. The communications of the encrypted information segment and the various confirmation requests are logged by the exchange system. Similarly, the communications of the related passwords to the exchange system are logged. By logging these activities, the potential for unintentional disclosure and unauthorized access of the information is greatly reduced.

Figure 19:
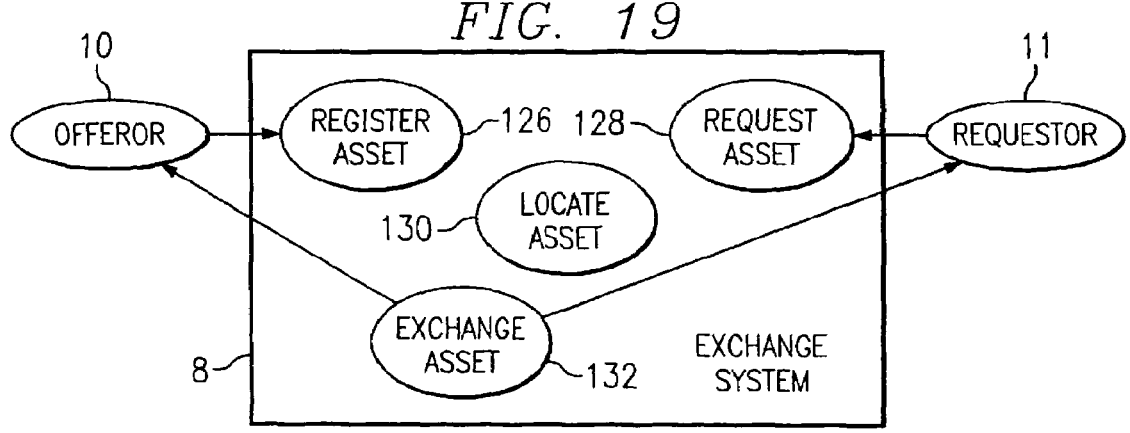
FIG. 19 depicts a UML use case diagram for a knowledge-based exchange process.

Referring now to FIG. 19, a UML use case diagram is depicted for the knowledge-based exchange process in an exchange system 8. The Offeror 10 offers an asset, such as information or capital, to a requester 11, such as individuals or organizations. Offeror 10 employs the Register Asset use case 126 to describe the specific asset being made available through exchange 8 to Requestor 11. Using the Request Asset use case 128, Requestor 11 issues a request for a particular type of asset. This may involve browsing all assets that have been previously registered by Offerors, or it may entail issuing a pending request that will inform the Requestor of subsequently registered assets. The Locate Asset use case 130 is the process by which a request is matched to one or more registered assets. When a match occurs, the Requestor 11 is informed of the existence of an asset of potential interest. At that point, the Requestor 11 and Offeror 10 participate in the Exchange Asset use case 132. In one embodiment, two parties exchange assets, with each party playing both the Offeror and Requestor roles. Each party offers an asset and requests an asset in return. In that case, the Exchange Asset use case 132 includes the transfer of both assets.

Figure 20:
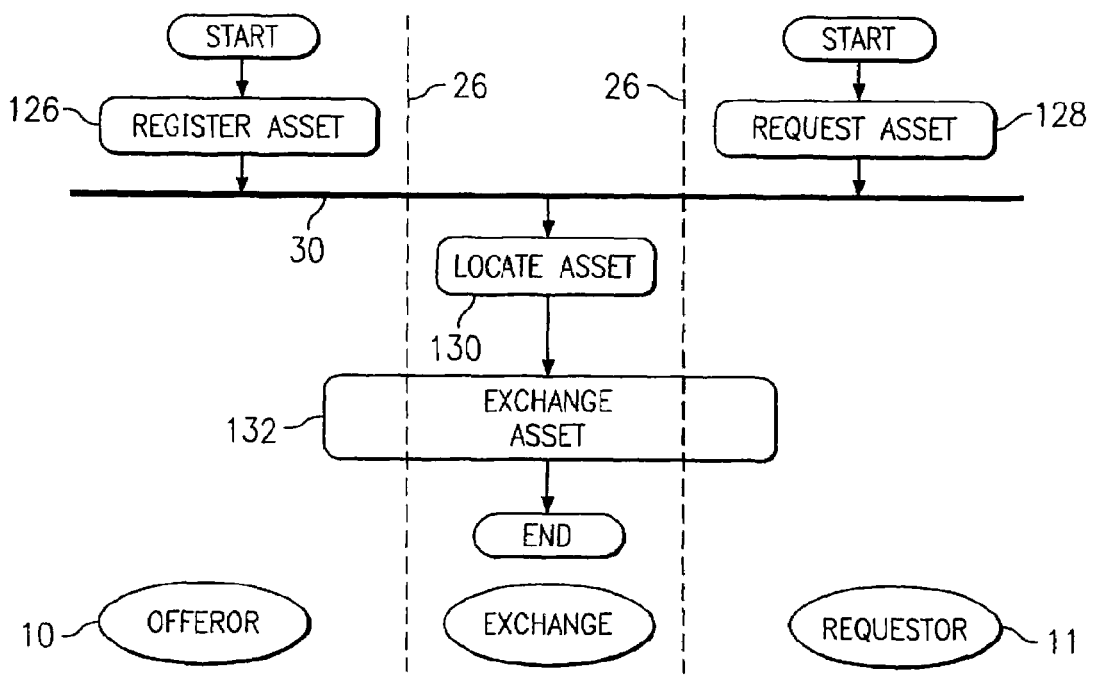
FIG. 20 depicts an activity diagram that defines the temporal sequence of use cases for a knowledge-based exchange.

Referring now to FIG. 20, an activity diagram describes the temporal flow of the use cases in FIG. 19. The synchronization bar 30 indicates that the Offeror's registering of an asset and the Requestor's issuing of a request for an asset at register asset step 126 may occur in any order. In some cases, the initial request for the asset occurs before the registration of the asset. In such a case, the request is pending, awaiting the subsequent registration of the asset. The swim-lanes 26 specify who is responsible for executing each activity. Locate asset step 130 matches a pending request to one or more assets and then exchange asset 132 exchanges the request and asset.

Referring now to FIG. 21, an activity diagram describes the steps in Register Asset use case and activity 126. These steps define the general process for registering an asset by an Offeror 10 as an initial step in the knowledge-based exchange process. An asset is first defined and registered on the exchange at the Define Asset activity 134. Once the asset have been defined and registered, it is offered for trading through the creation, registration, and listing on the exchange of an asset mediary. At step 136, an asset mediary is instantiated using the assets definition. At step 138, the mediary is registered and at step 140 the mediary is listed on exchange 8, allowing its inspection by other Mediaries.

The knowledge-based exchange process is based on a series of communications between a pair of mediaries. To register an asset to be traded, the Offeror 10 defines and registers an Offeror Mediary that controls external access to that asset. When an Requestor requests an asset, the Requestor registers a Requestor Mediary that searches for the requested asset. The Requestor Mediary is the Requestor's "porthole" into the trading and exchange process. When a Requestor Mediary finds a matching Offeror Mediary, the two mediaries collaborate to facilitate the negotiations for the exchange. The collaboration between the mediaries may require human intervention, such as the manual evaluation of an asset, or it may be automated. For instance, the use of digital automated equities (DAQs), provides one mechanism for automation.

Once an asset has been listed by an offeror mediary, as depicted by FIG. 22, the mediary ties together the asset 144, the specification of the content of the asset 148, and a specification of the offer of the asset. The class diagram depicted in FIG. 22 identifies a specification that a requestor can use to evaluate the value of an offering.

Once the Offer creates registers and lists an Offeror Mediary 142, the Mediary is placed in knowledge-based exchange system 8. The Mediary's identify specification 146 and content specification 148 are not publicly available, however, until the completion of the List Mediary activity.

The activity diagram in FIG. 23 defines the process for the Request Asset use case and activity 126, the results of which are the creation and registration of a Requestor Mediary to handle the Requestor's query for an asset. During the Instantiate Requestor Mediary activity 150, the Requestor creates the desired Requestor Mediary. Upon its registration at Register Mediary activity 152, the Mediary can seek a matching Offeror Mediary.

Referring now to FIG. 24, UML class diagram for the Requestor Mediary 154 is depicted. The Mediary 154 consists of a Query Specification 156 that describes the information being sought by the Requestor. The Query Specification 154 is used in the search for matching Offeror Mediaries. When one asset is being exchanged for another, each party will have both an Offeror Mediary and a Requestor Mediary. Through the identify specification in each party's Offeror Mediary, the other party can determine the value of asset being offered. A Requestor Mediary 154 also includes an Identity Evaluation Strategy 158 that it employs to evaluate the Identity Specification of the Offeror Mediary.

The Locate Asset use case and activity 130 embody the process of matching an Offeror Mediary to a Requestor Mediary. For the two Mediaries to match, the Content Specification 148 of the Offeror Mediary must logically imply the Query Specification 156 of the Requestor Mediary. For example, if the Content Specification states, "defines a mechanism for device polling AND runs on Unix systems," and the Query Specification states, "defines a mechanism for device polling," then the request matches the existing asset. If the two specifications are reversed, however, no match occurs.

Figure 25:
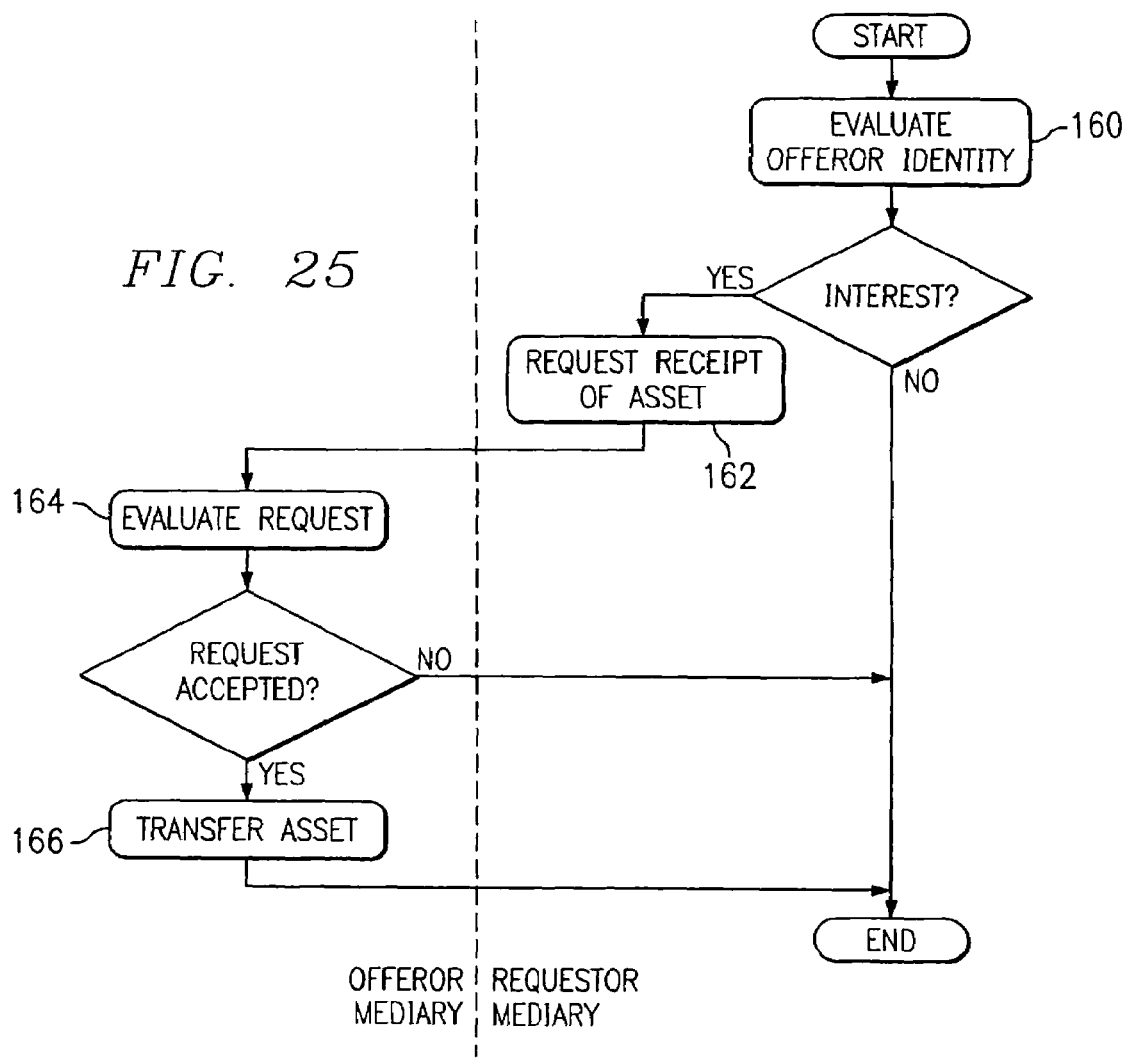
FIG. 25 depicts an activity diagram for the exchange asset use case.

The Exchange Asset use case and activity 132 constitutes the interactions between and Offeror Mediary and Requestor Mediary to achieve the exchange of the asset or assets. The activity diagram in FIG. 25 defines the steps in that process. At step 160, the Requestor Mediary evaluates the identity of the Offeror, such as by executing the Mediary's Identity Evaluation Strategy on the Offeror Mediary's Identity Specification. If the Requestor Mediary determines it is still interested in the asset, at step 162 the Requestor Mediary makes a request to the Offeror Mediary to obtain the asset. If the Requestor Mediary is not interested, the process ends. At step 164, the Offeror Mediary evaluates the request and either accepts the request resulting in a transfer at step 166 or rejects the request, end the process.

Figure 26:
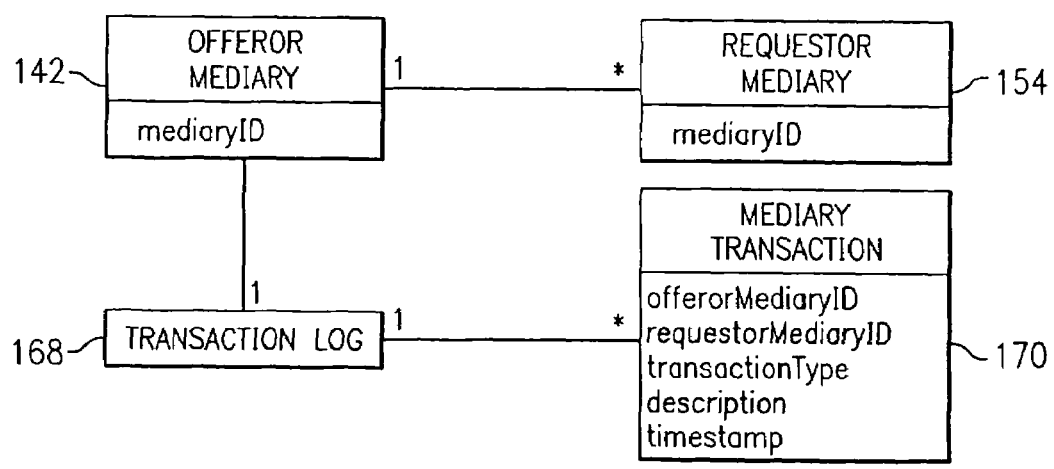
FIG. 26 depicts a class diagram for knowledge-based exchange logging.

The Offeror Mediary maintains an audit trail of each step of the exchange process. The class diagram in FIG. 26 defines the Transaction Log 168 and the content of each entry in the Log. A Transaction Log object is employed by Offeror Mediaries to log Mediary interactions. A Mediary Transaction object 170 is an entry in the log that defines one such interaction. It includes the identities of the Offeror Mediary 142 and the Requestor Mediary 154 in the interaction, the type and description of the interaction, and the date and time of the interaction.

Exchange System for Information Disclosure

One embodiment of a staged disclosure in a knowledge-driven exchange is the staged disclosure of information to one or more potential investors in a company. Referring again to FIG. 19, the UML use case diagram depicts the staged disclosure process in which the Offeror 10 offers proprietary information for staged disclosure to one or more Requestors 11 who are potential Investors. The Register Asset use case 126 is a function employed by the Offeror 10 to provide a summary of the information available to a community of Investors. Using the Request Asset use case 128, an Investor can issue a request for information. This may involve browsing all information that has been previously registered by Offerors, or it may entail issuing a pending request that will inform the Investor of subsequently registered information. The Locate Asset use case 130 is the process by which a request is matched to one or more pieces of registered information. When a match occurs, the Investor is informed of the existence of information of potential interest to the Investor. At that point, the Investor initiates the Exchange Asset use case 132 to provide a staged disclosure of information to the Investor. That use case may also require the participation of the Offeror of that information.

The activity diagram in FIG. 20 describes the temporal flow of the staged disclosure. The synchronization bar in the diagram indicates that the Offeror's registering of information and the Investor's issuing of a request could conceivably occur in either order. That is, in some cases, the initial request for information could occur before the registration of information. In such a case, the request is pending, awaiting the subsequent registration of information. A match cannot occur, however, until after the completion of both the registration and the matching request. The "swim-lanes" in the figure specify who is responsible for executing each activity.

Referring again to FIG. 21, the steps in the Register Asset use case and activity 126 are depicted to define the process for registering information. This is the Offeror's initial step in the staged disclosure process.

Figure 27:
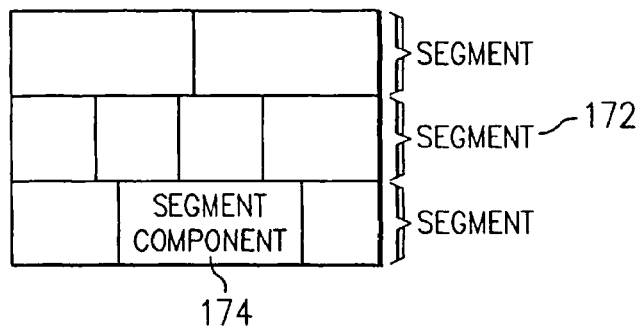
FIG. 27 depicts a conceptual view of segmented information.

For its staged disclosure, information is organized into segments, where each segment represents a "layer" of information. Where desired, a segment can further be broken into a set of components. Referring now to FIG. 27, a conceptual view of segmented information is depicted, where the layers and layer "slices" are segments 172 and segment components 174, respectively. Each layer 172 is disclosed during one stage of the disclosure process, beginning with the top layer first. At registration by the Offeror, the information to be disclosed is defined in this segmented form. Hence, if the information is not already defined in that form, the Offeror defines it as segmented information in the Define Asset activity 134 of FIG. 21.

Figure 28:
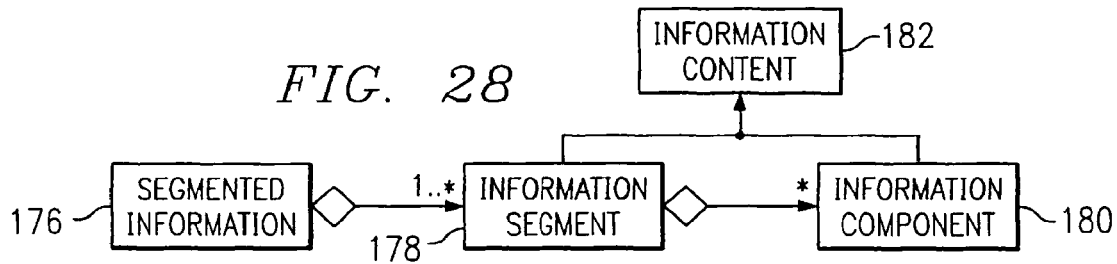
FIG. 28 depicts a class diagram for segmented information.

Upon definition of the segmented information with the Define Asset activity 134, the Offeror's information to be disclosed will be organized as specified in the (UML) class diagram in FIG. 28. A Segmented Information instance 176 consists of a set of Information Segments 178, each of which in turn can contains any number of Information Components 180. Both Information Segments and Information Components are specific types of Information Content 182.

The staged disclosure process is based on a series of communications between a pair of mediaries. To register segmented information for disclosure, the Offeror defines and registers an Offeror Mediary that controls external access to that information. In particular, the mediary associates an action and a capability with each component of the information. The capability permits access to that component. The mediary assigns the capability when the related action is fulfilled. For example, signing a non-disclosure agreement is an action that, upon its completion, provides the investor a capability to read a proprietary document.

When an Investor requests information, the Investor registers an Investor Mediary that searches for the requested information. The Investor Mediary is the Investor's "porthole" into the disclosure process. When an Investor Mediary finds a matching Offeror Mediary, the two mediaries collaborate to facilitate the staged disclosure process. The collaboration between the mediaries may require human intervention, such as the signing of a non-disclosure agreement, or it may be automated. The use of digital automated equities (DAQs) provides one mechanism for such automation.

Once segmented information has been defined, therefore, the next steps in the Register Asset process in FIG. 21 are the creation and registration of an offeror mediary for that segmented information. The mediary associates with each segment and segment component an action that, when executed, allows the disclosure of that segment or component. Specifically, when an Investor carries out the action, the Investor is provided a capability to access the segment or component. The mediary therefore controls the disclosure of the information being registered. As noted above, mediaries can be either manual or automated. A manual Offeror Mediary informs its Offeror that an Investor has completed an action and awaits further instructions from the Offeror. An automated Offeror Mediary, on the other hand, is capable, without Offeror intervention, of validating that an action has been completed and of providing the resulting capability to the Investor.

Figure 29:
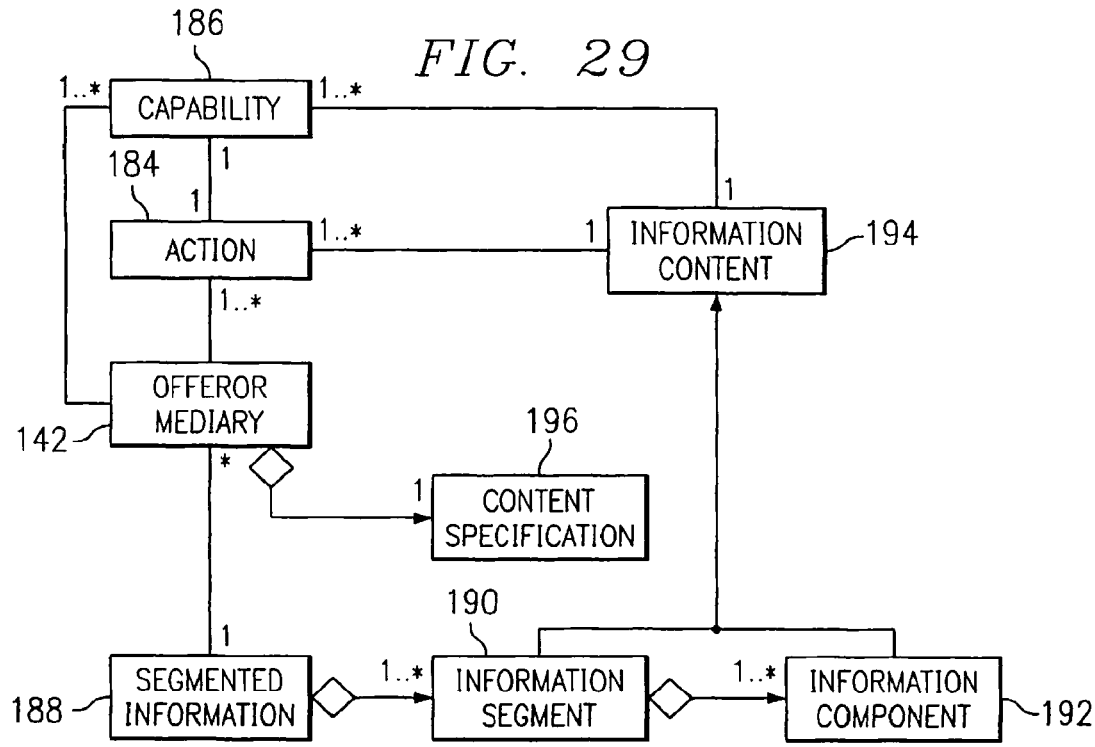
FIG. 29 depicts a class diagram of an offeror mediary.

Referring now to FIG. 29, a UML class diagram depicts the Offeror Mediary 142 and its related Actions 184 and Capabilities 186. Offeror Mediary 142 is linked to a Segmented Information object 188. The Segmented Information Object 188 includes as Information Content objects an information segment 190 and an information component 192 which are attached to an Action 184 that via Information Content object 194, when completed, provides a Capability 186 to read that object. Offeror Mediary 142 also includes a Content Specification object 196 that contains a specification of the information controlled by Offeror Mediary 142. Content Specification 196 is available to the public through exchange system 8 and is used when matching the information to queries by Investor Mediaries.

Once the Offer is represented by an Offeror Mediary 142, the Offeror then registers and lists that Offeror Mediary, as FIG. 21 indicates. When the Register Mediary activity 138 is complete, the Mediary has been placed in exchange system 8's staged disclosure system. The Mediary's Content Specification 196 is not publicly available, however, until the completion of the List Mediary activity 140.

Figure 30:
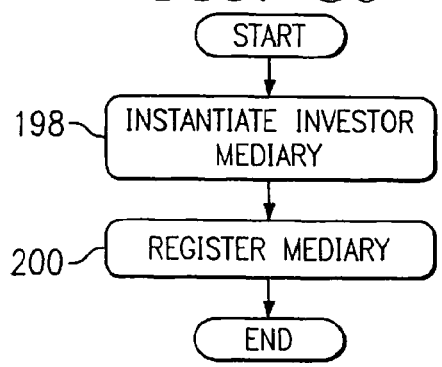
FIG. 30 depicts an activity diagram for requesting information as an asset in the request asset use case.

The activity diagram in FIG. 30 depicts the process for the Request Asset use case 128 in FIG. 19 and the identically named activity in FIG. 20, the major results of which are the creation and registration of an Investor Mediary at activity 198 to handle the Investor's query for information. During the Instantiate Investor Mediary activity 198, the Investor creates the desired Investor Mediary. Upon its registration at the Register Mediary activity 200, the Investor Mediary can seek a matching Offeror Mediary.

Figure 31:
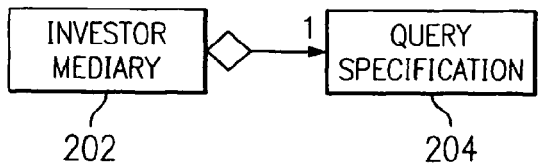
FIG. 31 depicts a class diagram for an investor mediary.

FIG. 31 depicts a UML class diagram for the Investor Mediary 202. The Mediary consists of a Query Specification 204 that describes the information being sought by the Investor. Query Specification 204 is used in the search for matching Offeror Mediaries.

The Locate Asset use case 130 in FIG. 19 and the activity of the same name in FIG. 20 embody the process of matching an Offeror Mediary 142 to an Investor Mediary 202 for the disclosure of information as an asset. For the two Mediaries to match, the Content Specification 196 of the Offeror Mediary must logically imply the Query Specification 204 of the Investor Mediary 202. For example, if the Content Specification states, "defines a mechanism for device polling AND runs on Unix systems," and the Query Specification states, "defines a mechanism for device polling," then the request matches the existing information. If the two specifications are reversed, however, no match occurs.

Figure 32:
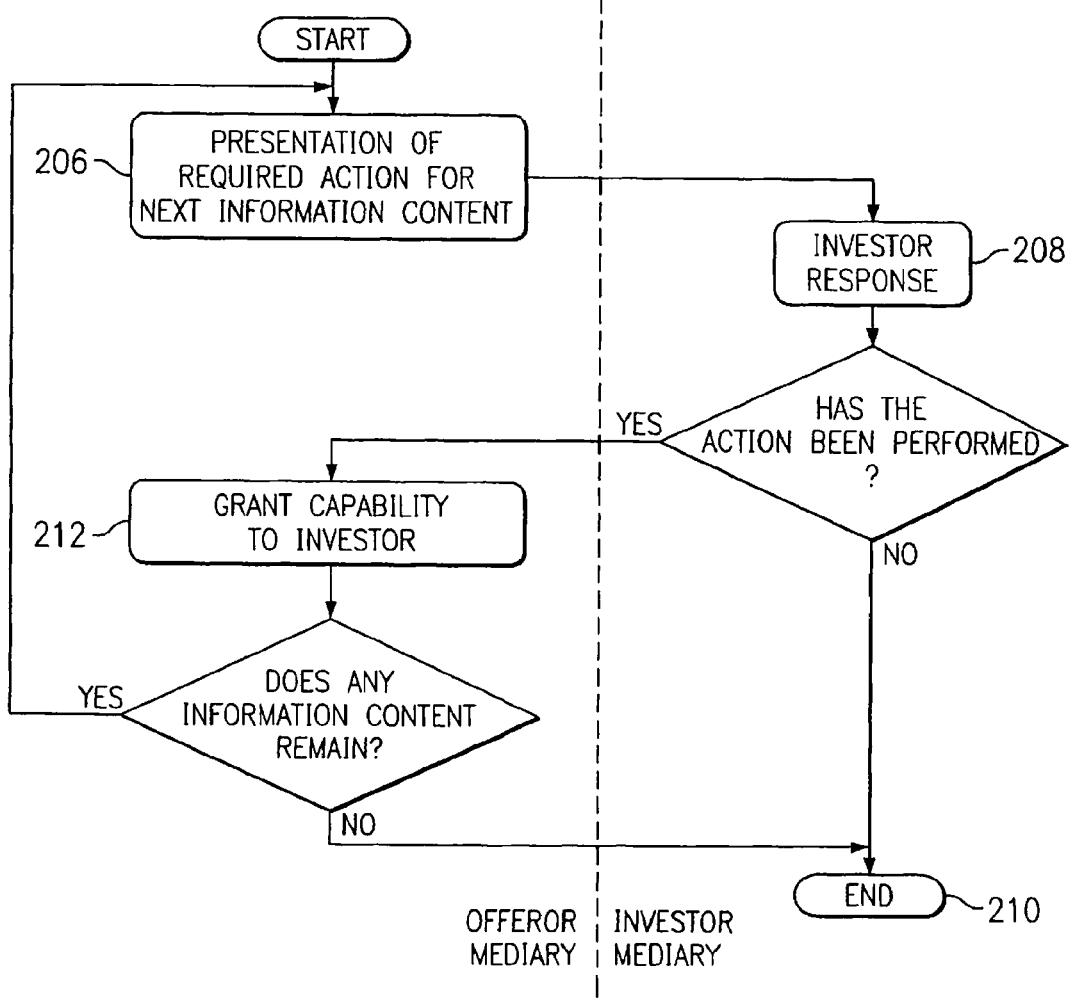
FIG. 32 depicts an activity diagram for the staged disclosure of information as an asset.

The Staged Disclosure of information as an asset depicted by FIGS. 19 and 20, constitute the interactions between and Offeror Mediary 142 and Investor Mediary 202 to achieve the disclosure of information in stages. The activity diagram in FIG. 32 defines the steps in that process. During the Presentation of Required Action activity 206, the Offeror Mediary 142 presents to the Investor Mediary 202 the Action for the next level of Information Content (that is, the next Information Segment 190, or the next Information Component 192 within the current Segmented information 188). The Investor must fulfill that Action in order to access the Content.

During the Investor Response activity 208, the Investor Mediary, perhaps with the manual assistance of the Investor and Offeror, responds either by fulfilling the Action or by rejecting the request from the Offeror Mediary to do so. If the Investor Mediary does not fulfill the Action, then the staged disclosure process terminates at step 210. If the Investor Mediary performs the Action, however, then at step 212 the Offeror Mediary grants the Investor Mediary a Capability to access the associated Information Content. This process continues while Information Content instances for this Segmented Information remain to be disclosed.

Figure 33:
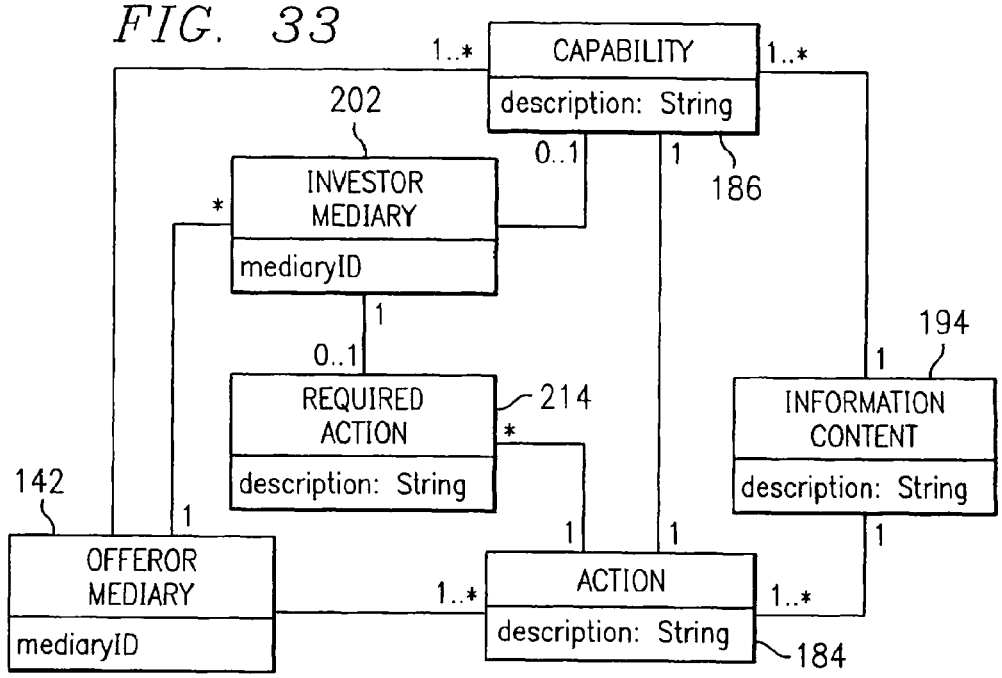
FIG. 33 depicts a class diagram for mediary interactions for staged disclosure.

The class diagram in FIG. 33 depicts the staged disclosure interaction between the Offeror Mediary 142 and Investor Mediary 202. A single Offeror Mediary 142 interacts with any number of Investor Mediaries 202. During each stage of the disclosure process, the Offeror Mediary 142 supplies a Required Action 214 to the Investor Mediary 202. A Required Action 214 is essentially a clone of an Action that belongs to that particular Investor Mediary 202. However, unlike an Action, a Required Action has no connection to a Capability 186 until the Required Action has been fulfilled.

Figure 34:
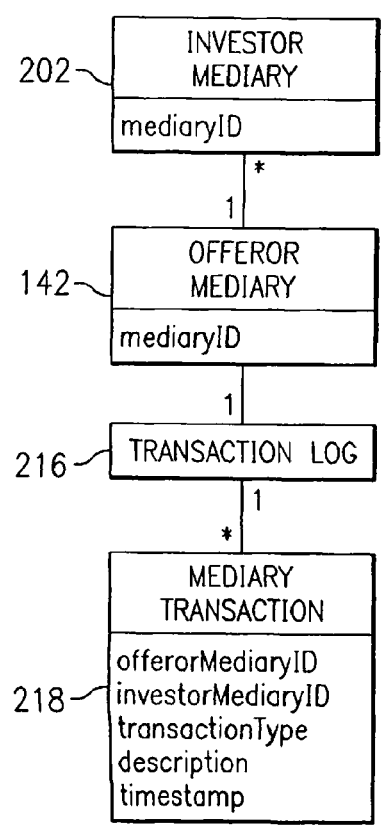
FIG. 34 depicts a class diagram for the logging of staged disclosure.

The Offeror Mediary 142 maintains an audit trail of each step of the staged disclosure process. During the Presentation of Required Action activity 206 and Grant Capability to Investor activity 212, therefore, the Offeror Mediary 142 logs any Actions and Capabilities it presents to the Investor Mediary 202. The class diagram depicted by FIG. 34 defines the Transaction Log and the content of each entry in the Log. A Transaction Log object 216 is employed by Offeror Mediaries 142 to log Mediary interactions. A Mediary Transaction object 218 is an entry in the log that defines one such interaction. It includes for instance, the identities of the two Mediaries in the interaction, the type and description of the interaction, and the date and time of the interaction.

An exemplary Disclosure Transaction Log is:

Disclosure Log
Investor ID: 1XX427

| Transaction Date | Related Objectmediary | Transaction Description |
| --- | --- | --- |
| 7-Apr-98 | 2XX342-P-002 | Communicate NDA "A" |
| 9-Apr-98 | 2XX342-P-002 | Receive Executed NDA "A" |
| 9-Apr-98 | 2XX342-P-002 | Communicate Transfer Authorization |
| 20-Apr-98 | 2XX342-P-002 | Receive Transfer Authorization Password |
| 20-Apr-99 | 2XX342-P-002 | Communicate Encrypted Objectmediary Segment "A" |
| 20-Apr-99 | 2XX342-P-002 | Communicate Segment Transfer Confirmation Request |
| 18-May-99 | 2XX342-P-002 | Receive Segment Transfer Confirmation Password |
| 18-May-99 | 2XX342-P-002 | Communicate Decryption Code |
| 10-Jan-99 | 1XX756-B-001 | Communicate NDA "A" |
| 10-Jan-99 | 1XX756-B-001 | Receive Executed NDA "A" |
| 10-Jan-99 | 1XX756-B-001 | Communicate Transfer Authorization |
| 15-Jan-99 | 1XX756-B-001 | Receive Transfer Authorization Password |
| 15-Jan-99 | 1XX756-B-001 | Communicate Encrypted Objectmediary Segment "A" |
| 15-Jan-99 | 1XX756-B-001 | Communicate Segment Transfer Confirmation Request |
| 14-Feb-99 | 1XX756-B-001 | Receive Segment Transfer Confirmation Password |
| 14-Feb-99 | 1XX756-B-001 | Communicate Decryption Code |

Each line defines one Mediary Transaction. Because this is a log for a particular Offeror Mediary, the "related object mediary" is the identity of the Investor Mediary. The date portion of each Transaction's timestamp, as well as the Transaction's description, are included in each log entry.

Figure 35:
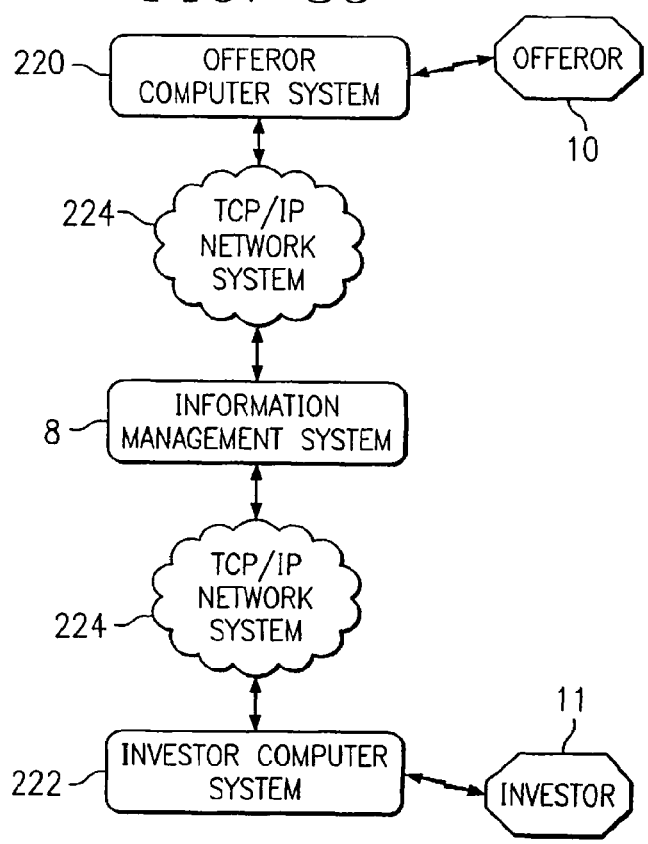
FIG. 35 depicts a block diagram of network communication for staged disclosure.

The block diagram in FIG. 35 describes the high-level communications in the embodiment of the staged disclosure process. Exchange system 8 communicates with Network System 224, such as an Internet interface or a secure network interface. Offeror 10 creates and lists Offeror Mediaries through Offeror computer system 220 in communication with exchange system 8 over network system 224. Investor 11 lists Investor Mediaries through Investor computer system 222 in communication with Network 224 and exchange system 8. If exchange system 8 finds a Match between an Offeror Mediary and Investor Mediary, notice is sent to Inventor 11 with a request for a required action. If Investor 11 performs the required action, such as agreeing to a level of non-disclosure, then exchange system 8 automatically provides incremental additional disclosure of information according to the requirements of Offeror or Mediary, including for instance a requirement of approval from Offeror 10. The Mediaries and their components, as well as the Transaction Log, are retained in persistent storage within the exchange system 8.

Exchange System for Naming

One embodiment of the present invention determines the availability of names for exchange in commercial use: A computerized method and system performs an automated search to determine the availability of a name, make registration of an offer for a name and support the offer, sale and transfer of the right to use a name in commerce.

Figure 36:
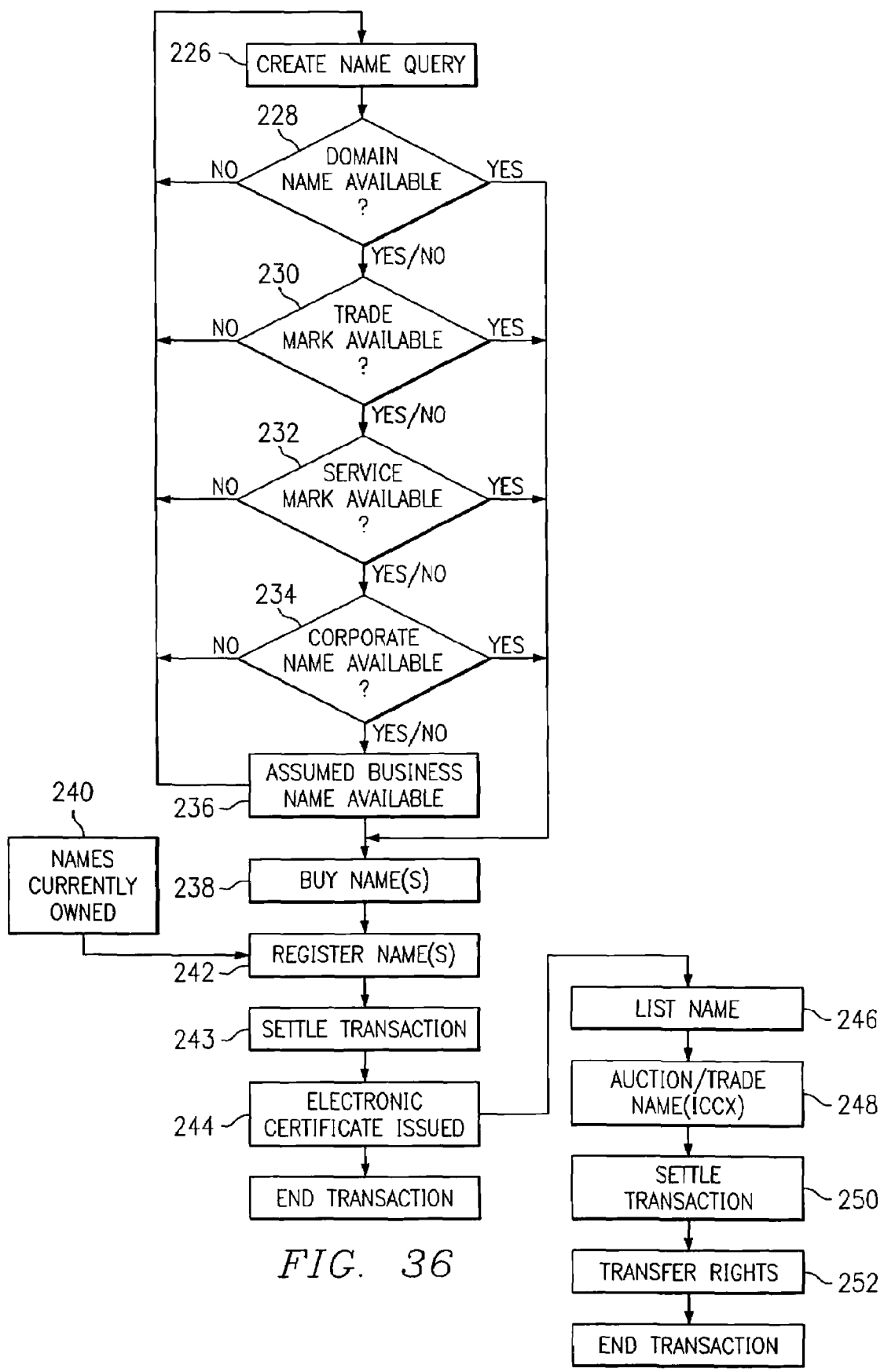
FIG. 36 depicts a flow diagram for establishing ownership of a name.
Figure 37:
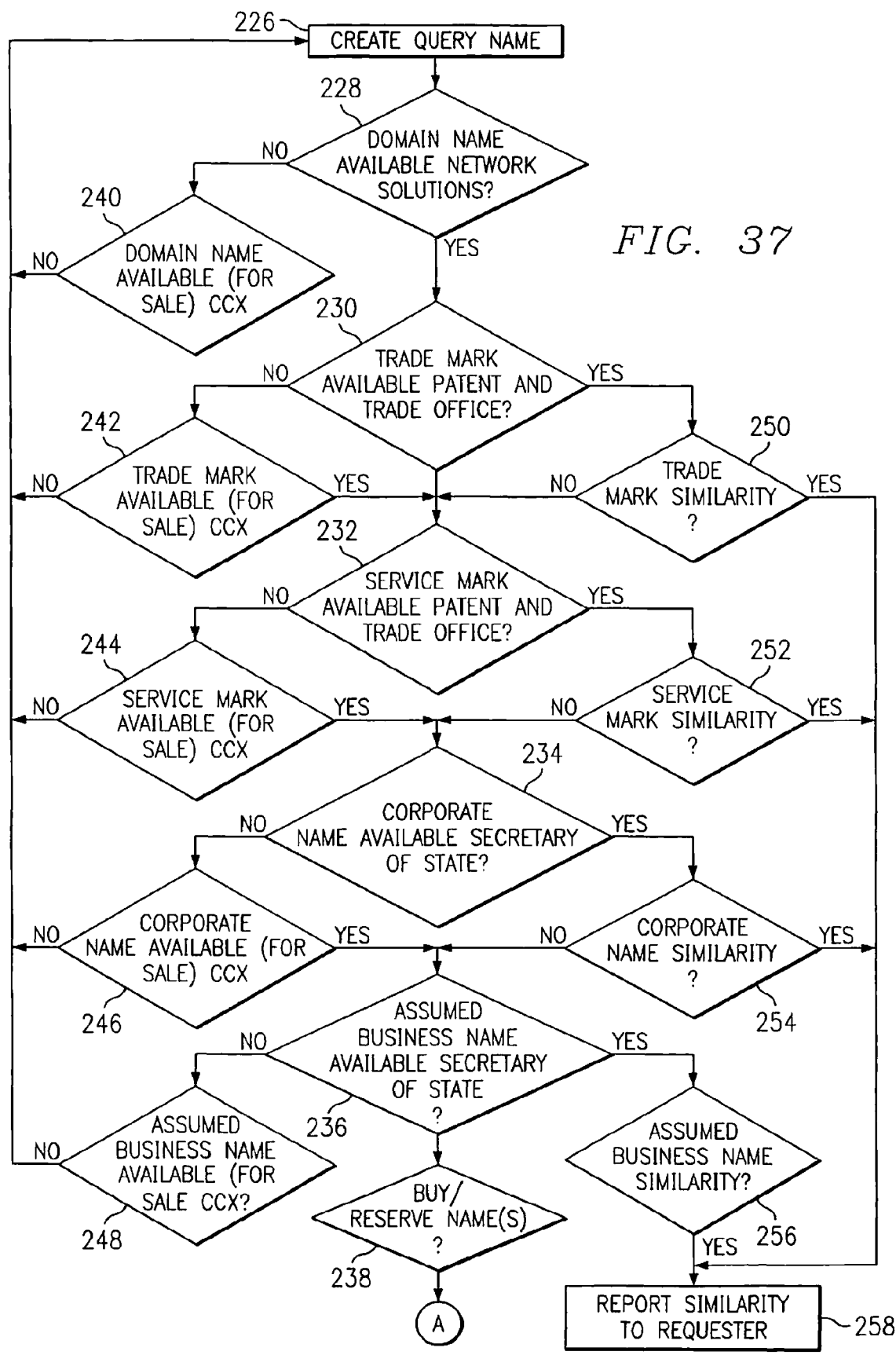
FIG. 37 depicts a flow diagram for an automated name search.

In one embodiment, multiple data bases are searched for purposes specified by a request to acquire rights to a name. Referring now to FIG. 36, a flow diagram depicts the sequence of steps to be performed by the computerized method and system for locating and exchanging rights to a name. At step 226, a requestor enters a name in the exchange system 8 computer software program to search availability of the name for use in one or more of the following categories: domain name for a web site at step 228, trade mark at step 230, service mark at step 232, name of corporation or other type of business organization (legal entity) at step 234 and/or assumed business name at step 236. An automated search of the appropriate data bases is performed and a message reporting the results of the search is returned to the requestor. For example, the report advises by an on screen message that the name queried is available and may be registered, or that an identical name is previously registered and is not available for registration. When name similarity is a consideration, the report indicates that there is a similar name and the degree of similarity. The report identifies the data base(s) reporting an identical or similar name. The exchange system also searches its own registration data base and reports, when on file, the identity and contact information of the legal owner to the rights of the name.

When a name queried is not available because there is an identical or similar name registered in one or more of the relevant data bases, then at step 240 the exchange system 8 searches its own registration data base to determine if the name has been registered as available for sale and transfer. In the event the queried name is available, the requestor may at step 242 electronically register the name—for jurisdictions permitting electronic registration—and/or alternatively manually registers the name.

In the event the requestor finds the queried name is not available, but the name is registered as available for sale and transfer, the requestor may direct the exchange system 8 to make an electronic inquiry of the owner at step 238, for instance through the listing of a mediary. The negotiation and transaction may be conducted electronically through the exchange system 8 or partially through the system in combination with other channels of communication.

In the event the parties negotiate a sale, the exchange system 8 settles the transaction electronically at step 242 and transfers ownership automatically at step 244 by changing the system's registration and by electronically filing transfer information with the appropriate jurisdiction—and/or alternatively offer a manual registration service for jurisdictions that do not offer electronic filing. Once a transaction is complete, the exchange system 8 lists an Offeror Mediary for the name at step 246 and makes the name available for inspection at step 246. If a requestor submits an offer acceptable for the name's owner, then at step 250 the exchange of the name may be arranged and settled at step 252. If no transaction occurs, then the Offeror's knowledge of the name is recorded.

Referring now to FIG. 7, a flow diagram depicts the steps for determining the availability of a name. A name inquiry at step 226 results in a domain name search with network solutions at step 228. If the name is not available, at step 240 a search is made on the exchange system 8 to determine if the domain name is available for sale. If the domain name is available at network solutions, a search is performed in sequence at step 230 for trademark availability with the Patent and Trademark Office, at step 232 for service mark availability with the Patent and Trademark Office, at step 234 corporate name availability with Secretary of State offices, and at step 236 assumed names available with the Secretary of State offices. At each of these searches, if the search results in the name not being available, a secondary search is performed at steps 242, 244, 246, and 248 to determine if the name is available for sale on the exchange system. If a search results in identification of similar names at steps 250, 252, 254 and 256 then at step 258 the requestor is informed of the similarity. If at step 238 the name is available, the requestor can initiate registration of the name or purchase of the name if the name is only available for sale from another owner. If the name is not available, the purchaser can continue to search for other names.

What is claimed is:

1. A method for operating a network of computer systems to manage capital exchange offers through a series of staged computer-mediated disclosures comprising:

operating a computer system to define and create at least a first and a second capital exchange offer as first and second software objects (capital-exchange-offer software objects) wherein each capital-exchange-offer software object contains terms of an offer and is associated with an owner;

operating a computer system to register the at least first and second capital exchange offers as software objects stored in persistent storage on a digital automated exchange executing on an exchange computer system operating for the purpose of conducting capital exchange offers;

operating a computer system to enable defining and creating object mediaries, on the automated digital exchange computer system, for each of the at least first and second capital exchange offers as software objects configured and instantiated for the purpose of managing capital exchange offers;

configuring the object mediaries to cause a computer system to search for certain attributes of capital exchange offers registered on the digital automated exchange computer system, and to report back to the owners of the object mediaries the result of such searches;

operating the digital automated exchange computer system to execute at least a first object mediary to call upon functions of at least one second object mediary to determine if a match exists between terms offered by the first object mediary and terms required by at least one second object mediary;

operating the digital automated exchange computer system to present the owner associated with a first capital-exchange-offer software object with at least one of any capital-exchange-offer software objects that match the first capital-exchange-offer software object by electronically transmitting a message indicative of the match;

enabling the owner associated with the first capital-exchange-offer software object to initiate negotiation with the owner of the at least one of any such matching capital-exchange software object by operating the digital automated exchange computer system to receive a message indicative of the intent of the owner associated with the first capital-exchange-offer software object to initiate negotiation, wherein the negotiation comprises:

operating the digital automated exchange computer system to execute a staged disclosure process comprising processing information segmented into information components wherein each segment has associated therewith an action and a capability wherein a potential accessor of the information component is required to perform the action before being allowed to execute the capability; and transmitting a message corresponding to the required action to each participant of the negotiation.

2. The method of claim 1 further comprising:

defining a software object corresponding to an asset wherein the software object corresponding to an asset comprises:

wherein the function selected from the set of functions having the members (1) the ability to calculate a value given certain assumptions, (2) a maintenance of a pedigree of transaction history involving the digital automated equity, (3) an embodiment of variable business logic, (4) an embodiment of variable vocabulary, (5) an ability to declare the identity of the digital automated equity; and associating the software object corresponding to an asset with a capital-exchange-offer software object.

3. The method of claim 1 wherein the software object corresponding to an asset further comprises:

user-defined content visible characteristics associated with the underlying asset.

4. The method of claim 1 wherein a capital-exchange-offer software object comprises:
  an asset software object;
  an offered exchange price; and
  exchange conditions; and wherein the step of registering the at least one capital-exchange-offer software object operates to initiate an offer to exchange the at least one asset software object according to the offered exchange price and the exchange conditions.

5. The method of claim 4 wherein the determination if a match exists further comprises executing a function of at least one object mediary to compare at least one of the offered exchange price and exchange conditions of the at least one capital-exchange software object against at least one of an offered exchange price and exchange conditions for at least a second registered capital-exchange software object to determine if the exchange price or exchange conditions provide a match.

6. The method of claim 5 wherein the step of comparing at least one of the offered exchange price and exchange conditions of the at least one capital exchange software object against at least one of an offered exchange price and exchange conditions for at least a second registered capital exchange software object further comprises causing at least one of the offered exchange price and exchange conditions of the at least one capital exchange software object against at least one of an offered exchange price and exchange conditions for at least a second registered capital exchange software object comprises the at least one capital exchange software object querying other registered capital exchange software objects to determine whether the offered exchange price and exchange conditions match those required by the at least one capital exchange software object.

7. The method of claim 1 wherein the staged disclosure process:

operating an offeror mediary software object having a required action presentation logic to present a required action for a next information content; and
a grant capability logic;

operating an investor mediary software object in communication with the offeror mediary and having
a logic to perform the required action presented by the offeror mediary and operable to communicate the result of such action to the offeror mediary; and wherein offeror mediary grants capability to the investor mediary upon satisfaction of the required action.

8. The method of claim 7 required action is acquiescing to a non-disclosure agreement, and the capability is a grant of access to information protected under the non-disclosure agreement.

9. A computerized exchange system operable to manage exchange offers of capital assets through a series of staged computer-mediated disclosures, the computerized exchange system comprising:

means for creating and defining at least a first and a second capital exchange offer as first and second software objects (capital-exchange-offer software objects) wherein each capital-exchange-offer software object contains terms of an offer and is associated with an owner;

means for registering the at least first and second capital exchange offers as software objects stored in persistent storage on a digital automated exchange executing on an exchange computer system operating for the purpose of conducting capital exchange offers;

means for defining creating object mediaries, on the exchange computer system, for each of the at least first and second capital exchange offers as software objects configured and instantiated for the purpose of managing capital exchange offers;

means for configuring the object mediaries to search for certain attributes of capital exchange offers registered on the digital automated exchange, and to report back to the owners of the object mediaries the result of such searches;

means for executing a first object mediary to call upon functions of a second object mediary to determine if a match exists between terms offered by the first object mediary and terms required by at least one second object mediary;

means for presenting the owner associated with a first capital-exchange-offer software object with at least one of any capital-exchange-offer software objects that match the first capital-exchange-offer software object;

means for enabling the owner of the first capital-exchange-offer software object to initiate negotiation with the owner of the at least one any such matching capital-exchange software object, wherein the negotiation comprises:
  means for executing a staged disclosure process comprising processing information segmented into information components wherein each segment has associated there with an action and a capability wherein a potential accessor of the information component is required to perform the action before being allowed to execute the capability.

10. The computerized exchange of claim 9 further comprising:
  means for defining a software object corresponding to an asset wherein the software object corresponding to an asset comprises:
    at least one function selected from the set of functions having the members (1) the ability to calculate a value given certain assumptions, (2) a maintenance of a pedigree of transaction history involving the digital automated equity, (3) an embodiment of variable business logic, (4) an embodiment of variable vocabulary, (5) an ability to declare the identity of the digital automated equity.

11. The computerized exchange of claim 10 wherein the software object corresponding to an asset further comprises user-defined content containing capability to define and allow visible characteristics associated with the underlying asset.

12. The computerized exchange of claim 9 wherein a capital-exchange-offer software object comprises:
  an asset software object;
  an offered exchange price; and
  exchange conditions; and
  wherein the step of registering the at least one capital-exchange-offer software object operates to initiate an offer to exchange the at least one asset software object according to the offered exchange price and the exchange conditions.

13. The computerized exchange of claim 12 wherein the means for determination if a match exists further comprises means to execute a function of at least one object mediary to compare at least one of the offered exchange price and exchange conditions of the at least one capital exchange software object against at least one of an offered exchange price and exchange conditions for at least a second registered capital exchange software object to determine if the exchange price or exchange conditions provide a match.

14. The computerized exchange of claim 13 wherein the logic to compare at least one of the offered exchange price and exchange conditions of the at least one capital exchange software object against at least one of an offered exchange price and exchange conditions for at least a second registered capital exchange software object further comprising logic to cause at least one of the offered exchange price and exchange conditions of the at least one capital exchange software object against at least one of an offered exchange price and exchange conditions for at least a second registered capital exchange software object comprises the at least one capital exchange software object querying other registered capital exchange software objects to determine whether the offered exchange price and exchange conditions match those required by the at least one capital exchange software object.

15. The computerized exchange of claim 9 wherein the staged disclosure logic comprises:
  an offeror mediary software object having
    a required action presentation logic to present a required action for a next information content; and
    a grant capability logic;
  an investor mediary software object in communication with the offeror mediary and having
    a logic to perform the required action presented by the offeror mediary and operable to communicate the result of such action to the offeror mediary; and
  wherein offeror mediary grants capability to the investor mediary upon satisfaction of the required action.

16. The computerized exchange of claim 15 required action is acquiescing to a non-disclosure agreement, and the capability is a grant of access to information protected under the non-disclosure agreement.

* * * * *